(12) United States Patent
Schechter

(10) Patent No.: US 11,627,186 B2
(45) Date of Patent: Apr. 11, 2023

(54) WIRELESS NETWORK OF ENVIRONMENTAL SENSOR UNITS

(75) Inventor: Harry J. Schechter, Needham, MA (US)

(73) Assignee: Digi International, Inc., Minnetonka, MN (US)

( * ) Notice: Subject to any disclaimer, the term of this patent is extended or adjusted under 35 U.S.C. 154(b) by 1664 days.

(21) Appl. No.: 13/474,372

(22) Filed: May 17, 2012

(65) Prior Publication Data

US 2013/0311140 A1 Nov. 21, 2013

(51) Int. Cl.

| | | |
|---|---|---|
| H04L 67/12 | (2022.01) | |
| H04L 67/125 | (2022.01) | |
| H04L 67/00 | (2022.01) | |
| H04W 80/08 | (2009.01) | |
| H04W 4/50 | (2018.01) | |

(52) U.S. Cl.
CPC ............ *H04L 67/12* (2013.01); *H04L 67/125* (2013.01); *H04L 67/34* (2013.01); *H04W 4/50* (2018.02); *H04W 80/085* (2013.01)

(58) Field of Classification Search
CPC ....... H04L 67/34; H04L 67/12; H04L 67/125; H04L 12/2803; H04W 80/085; H04W 4/001; G08B 25/14; G08B 25/009
USPC ................................. 709/230, 246
See application file for complete search history.

(56) References Cited

U.S. PATENT DOCUMENTS

| | | | |
|---|---|---|---|
| 5,892,441 A | | 4/1999 | Woolley et al. |
| 6,112,246 A | | 8/2000 | Horbal et al. |
| 6,509,830 B1 | | 1/2003 | Elliott |
| 6,553,336 B1 | * | 4/2003 | Johnson et al. ............... 702/188 |
| 6,646,564 B1 | | 11/2003 | Azieres et al. |
| 6,741,174 B2 | | 5/2004 | Rhoades et al. |
| 6,817,757 B1 | | 11/2004 | Wallace |
| 7,026,929 B1 | * | 4/2006 | Wallace ............... G08B 25/003 340/539.13 |
| 7,191,097 B1 | | 3/2007 | Lee et al. |
| 7,342,504 B2 | | 3/2008 | Crane et al. |
| 7,456,736 B2 | * | 11/2008 | Primm et al. ................. 340/540 |

(Continued)

OTHER PUBLICATIONS

U.S. Appl. No. 13/554,858, filed Jul. 20, 2012, Schechter et al.

(Continued)

*Primary Examiner* — Hitesh Patel
(74) *Attorney, Agent, or Firm* — Wolf, Greenfield & Sacks, P.C.

(57) ABSTRACT

Environmental monitoring systems that include base stations and environmental sensor units (ESUs) that communicate in a wireless sensor network. A base station may include environmental sensors and may communicate with a remote server using a wide-area wireless network. The base station may also communicate with an environmental sensor unit using a wireless personal area network. The ESU may include environmental sensors and may communicate with the remote server via the base station. The base station and ESU may be adapted to automatically pair with one another to enable the ESU to communicate via the base station. An ESU may also be adapted to process data regarding environmental conditions by automatically determining a type of environmental sensor from which the data was received and processing the data based on the type. An ESU may also include physical ports by which new sensors can be connected to the ESU.

24 Claims, 16 Drawing Sheets

(56) References Cited

U.S. PATENT DOCUMENTS

| | | | |
|---|---|---|---|
| 7,483,805 B2 | 1/2009 | Sparks et al. | |
| 7,688,952 B2 | 3/2010 | Light et al. | |
| 7,762,470 B2* | 7/2010 | Finn et al. | 235/492 |
| 7,822,387 B2 | 10/2010 | Gross | |
| 7,853,210 B2* | 12/2010 | Meyers | H04Q 9/00 |
| | | | 455/41.2 |
| 7,902,975 B2 | 3/2011 | Glenn et al. | |
| 7,952,485 B2 | 5/2011 | Schechter et al. | |
| 8,181,113 B2* | 5/2012 | Abbott et al. | 715/744 |
| 8,228,183 B2 | 7/2012 | Glenn et al. | |
| 8,248,252 B2 | 8/2012 | Schechter et al. | |
| 8,547,226 B2 | 10/2013 | Schechter et al. | |
| 8,599,012 B2 | 12/2013 | Schechter et al. | |
| 8,626,210 B2* | 1/2014 | Hicks, III | G08B 25/004 |
| | | | 455/466 |
| 8,779,926 B2 | 7/2014 | Schechter | |
| 9,275,093 B2* | 3/2016 | Pandey | H04L 67/12 |
| 10,924,376 B2* | 2/2021 | Bhaya | G06F 16/3344 |
| 2003/0016128 A1* | 1/2003 | Lutz | G08C 19/00 |
| | | | 340/517 |
| 2005/0285748 A1* | 12/2005 | Pedraza | E04B 1/70 |
| | | | 340/602 |
| 2006/0028335 A1 | 2/2006 | Glenn et al. | |
| 2006/0100002 A1* | 5/2006 | Luebke | G06F 3/0362 |
| | | | 455/574 |
| 2006/0271695 A1 | 11/2006 | Lavian | |
| 2006/0274644 A1* | 12/2006 | Budampati | H04W 24/04 |
| | | | 370/216 |
| 2007/0019641 A1* | 1/2007 | Pai et al. | 370/389 |
| 2007/0139168 A1* | 6/2007 | Rennie | G08G 1/017 |
| | | | 340/425.5 |
| 2007/0139183 A1 | 6/2007 | Kates | |
| 2008/0052044 A1 | 2/2008 | Shoenfeld | |
| 2008/0056261 A1* | 3/2008 | Osborn et al. | 370/392 |
| 2008/0176539 A1 | 7/2008 | Staton et al. | |
| 2008/0186166 A1 | 8/2008 | Zhou et al. | |
| 2009/0119142 A1* | 5/2009 | Yenni | G06Q 10/06 |
| | | | 705/7.15 |
| 2009/0284376 A1* | 11/2009 | Byun | G06K 19/0717 |
| | | | 340/572.1 |
| 2010/0083356 A1* | 4/2010 | Steckley | H04L 12/2818 |
| | | | 726/5 |
| 2010/0127880 A1* | 5/2010 | Schechter et al. | 340/584 |
| 2010/0127881 A1* | 5/2010 | Schechter et al. | 340/584 |
| 2010/0150122 A1* | 6/2010 | Berger et al. | 370/338 |
| 2010/0295671 A1* | 11/2010 | Sweeney | G08B 17/00 |
| | | | 340/533 |
| 2010/0312881 A1 | 12/2010 | Davis et al. | |
| 2012/0080944 A1* | 4/2012 | Recker | H02J 9/02 |
| | | | 307/25 |
| 2012/0099579 A1* | 4/2012 | Kim et al. | 370/338 |
| 2012/0143383 A1* | 6/2012 | Cooperrider et al. | 700/295 |
| 2013/0157637 A1* | 6/2013 | Bos | 455/418 |
| 2013/0300643 A1* | 11/2013 | Pedersen | H04B 17/24 |
| | | | 345/156 |
| 2013/0311140 A1* | 11/2013 | Schechter | 702/188 |

OTHER PUBLICATIONS

U.S. Appl. No. 13/554,877, filed Jul. 20, 2012, Schechter et al.
U.S. Appl. No. 13/340,051, filed Dec. 29, 2011, Schechter.
Abbasi et al., "A survey on clustering algorithms for wireless sensor networks," Computer Communications 30, published 2007, pp. 2826-2841.
Cryolog, Traceo product literature, http://www.cryolog.com/en/pages/products_and_services/traceo/index.php, p. 1, 2007, downloaded Oct. 23, 2008.
EasyLog USB Data Logger product literature, http://www.lascarelectronics.com/teniperaturedatalogger.php?datalogger=102, p. 1, downloaded. Oct. 23, 2008.
IButtonLink Temperature Monitor product literature, http://www.ibuttonlink.com/I-wire-interface-masters.aspx, pp. 1-2, downloaded Oct. 23, 2008.
IT Watchdogs WeatherDuck product literature, http://www.itwatchdogs.com/duckdetails.shtml. p. 1, 2002-2005, downloaded Oct. 23, 2008.
Sawides et al., "The Bits and Flops of the N-hop Multilateration Primitive for Node Localization Problems," WSNA'02, Sep. 28, 2002, Atlanta, Georgia.
Sugano et al., "Indoor Localization System Using RSSI Measurement of Wireless Sensor network Based on Zigbee Standard", Wireless and Optical Communications, 2006, pp. 1-6.
THUM—Temperature Humidity USB Monitor product literature, Practical Design Group, LLC, http://practsol.com/thum.htm, pp. 1-2, 2004-2008, downloaded Oct. 23, 2008.
USB Tenki: USB Temperature sensors and more product literature, http://www.raphnet.net/electronique/usbtenki/index_en.php, pp. 1-8, 2002-2008, downloaded. Oct. 23, 2008.
Younis et al., "Distributed Clustering in Ad-hoc Sensor Networks: a Hybrid, Energy-Efficient Approach," In Proceedings of IEEE INFOCOM, vol. 1, pp. 629-640, Mar. 2004.
Zanca et al., "Experimental comparison of RSSI-based localization algorithms for indoor wireless sensor networks," REALWSN'08, Apr. 1, 2008, Glasgow, United Kingdom.
Zhao et al., "Wireless Sensor Networks, an Information Processing Approach," Morgan Kaufmann Publishers, 2004, pp. 117-131.
"ZigBee—Wikipedia, the free encyclopedia," available at http:/en.wikipedia.org/wiki/Zigbee, retrieved Dec. 23, 2011.

* cited by examiner

| 0 | Message Count (1 byte) | Device ID (10 bytes) | Message ID (1 Byte) | Message Content (N bytes) | Message ID (1 Byte) | Message Content (N bytes) | CRC (1 byte) |

| 0 | Message Count (1 byte) | Message ID (1 Byte) | Message Content (N bytes) | Message ID (1 Byte) | Message Content (N bytes) | CRC (1 byte) |

WIRELESS NETWORK OF ENVIRONMENTAL SENSOR UNITS

BACKGROUND

Temperature monitoring is used in many industries. For example, restaurants and food processing companies that rely on refrigeration equipment to keep their products fresh frequently use temperature monitoring. If a malfunction of the refrigeration equipment is not detected promptly, food could become too hot or too cold, resulting in damage to the food products. For a business that relies on food, such damage could result in a large monetary loss and potentially a serious business disruption.

As another example, companies that operate servers or other computer equipment may also monitor temperature of their equipment. Sometimes, a malfunctioning component of the computer equipment will generate excessive heat, or a cooling system for reducing a temperature of the computer equipment may malfunction or fail, resulting in a temperature of the computer equipment increasing. Excessive heat may cause components to fail because they are operating beyond their proper operating temperature. An increase in temperature of the computer equipment may therefore indicate a defect that may need to be corrected before such a failure.

Temperature monitoring systems are known. These systems incorporate temperature sensors attached to or mounted near equipment for which temperature is to be monitored. The system responds if the temperature sensor indicates a temperature outside of a normal operating range. One type of response that has been used is to raise an alarm at a facility where the monitored equipment is located. Some systems use bells, flashing lights or other forms of audible or visible indications of an improper operating temperature.

SUMMARY

In one embodiment, there is provided a method of configuring an environmental monitoring system to monitor environmental conditions in an environment. The method comprises providing an environmental sensor unit and a base station that are configured to automatically associate with one another upon application of power to the environmental sensor unit and the base station and configuring a server to monitor one or more environmental conditions in a location. The method further comprises receiving at the server communications from the base station that the environmental sensor unit and the base station are operating in the environment and monitoring at least one environmental condition based on data collected at the environmental sensor unit and relayed to the server via the base station.

In another embodiment, there is provided an apparatus to process and transmit information produced by at least one environmental sensor, where each of the at least one environmental sensor is configured to produce a value identifying a current environmental condition of an environment in which the apparatus is located. Each environmental sensor is of a sensor type of a plurality of sensor types, where each sensor type is associated with an environmental condition of a plurality of environmental conditions. The apparatus comprises at least one circuit to receive data as input and to output processed data. The at least one circuit is configured to, based on input received from a first environmental sensor comprising a first value identifying a first current environmental condition monitored by the first environmental sensor, select processing to perform on the first value based on a first sensor type of the first environmental sensor and perform the selected processing on the first value to produce a first processed value as the processed data to be output. The apparatus further comprises a wireless transceiver to transmit the processed data from the apparatus according to a first wireless communication protocol, where the processed data is formatted in accordance with a data communication protocol.

In a further embodiment, there is provided a method of providing to an environmental sensor unit, adapted to communicate via a first wireless communication protocol, access to a second network operating according to a second communication protocol. The first environmental sensor unit comprises at least one environmental sensor to monitor at least one environmental condition of an environment in which the first environmental sensor unit is located. The method comprises selecting, from at least one other device adapted to communicate according to the first wireless communication protocol and to communicate via the second network, a device with which to associate the environmental sensor unit for transmitting communications to the second network. The selecting comprises transmitting, from the environmental sensor unit, a request for responses from devices within communication range of the environmental sensor unit that are adapted to communicate via the first wireless communication protocol and provide access to the second network, receiving at least one response to the request from at least one responding device, and choosing the device from the at least one responding device based on at least one criterion. The method further comprises transmitting to an environmental monitoring server at least one communication from the environmental sensor unit according to the first wireless communication protocol, each of the at least one communication comprising data related to the at least one environmental condition and an identifier for the device.

In another embodiment, there is provided a method of communicating in an environmental monitoring system comprising an environmental sensor unit to produce data regarding at least one environmental condition, a server to analyze and store the data regarding the at least one environmental condition, and a device. The method comprises operating the device to carry out an act of receiving a communication from the environmental sensor unit according to a first wireless communication protocol and a data communication protocol, the data communication protocol being a stateless protocol. The communication comprises data regarding the at least one environmental condition and an identifier for the device. The method further comprises operating the device to carry out acts of transmitting the communication to the server according to a second communication protocol and the data communication protocol and, in response to receiving a response communication from the server according to the second communication protocol and the data communication protocol, transmitting the response communication to the environmental sensor unit via the first wireless communication protocol and the data communication protocol.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 12 is a block diagram of an example of a data format that may be used for communicating data from an environmental sensor unit; and FIG. 13 is a block diagram of an example of a data format that may be used for communicating data from a server.

DETAILED DESCRIPTION

Figure 1:
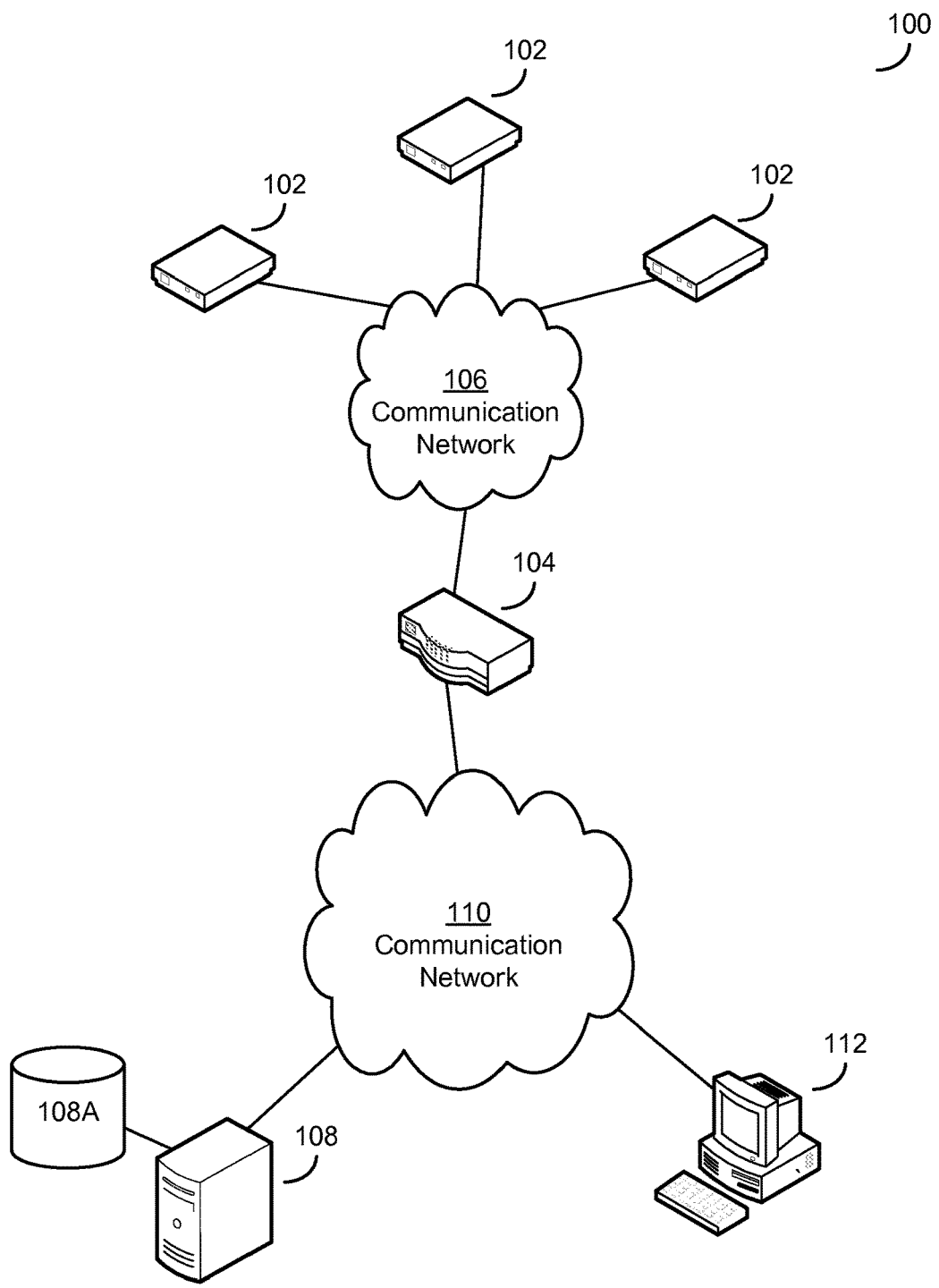
FIG. 1 is a sketch of an exemplary system including a server, a base station, and environmental sensor units operating in accordance with techniques described herein.

Applicant has recognized and appreciated that difficulty in setting up and configuring an environmental monitoring system adds to the cost and impedes the use of environmental monitoring. As a result, environmental monitoring is not currently used in all scenarios in which it could prevent waste or other problems that might be prevented by detecting undesired environmental conditions. Further, the Applicant has recognized and appreciated that wireless networks including low-power environmental sensor units and base stations that communicate with a server regarding environmental conditions of the environmental networks can provide simple installation of an environmental monitoring system, even when the area to be monitored is relatively large. These units may be designed to operate together, without express programming or other express configuration.

In some embodiments, the base station may be configured to communicate with a server that monitors environmental conditions based on measurements made by sensors deployed in a monitored area. Communications between the base station and the server may be made over a wide area network, such as a cellular network. The base station may contain environmental sensors or/or may operate with sensor units.

One or more low-power environmental sensor units may measure at least one environmental condition in the monitored area and communicate regarding the at least one environmental condition with the base station. Such environmental sensor units may communicate with the base station via a low-power wireless communication protocol, such as a wireless personal area network protocol (WPAN), but may not be configured to communicate directly to the server. Such environmental sensor units may instead transmit data that is to be sent to the server to the base station, using the low-power wireless communication protocol, and the base station may relay the data to the server.

The base stations and/or environmental sensor units may be configured to automatically establish communication to support operation of a system without any express configuration. For example, when an environmental sensor unit is first deployed in an environment, the environmental sensor unit may wirelessly query to identify one or more base stations or other environmental sensor units via which the environmental sensor unit may communicate data regarding environmental conditions to the server.

To further facilitate easy setup, environmental sensors units may also permit easy expansion of the environmental sensor units and the types of environmental monitoring carried out by such systems. An environmental sensor unit may include one or more ports to permit environmental sensors to be coupled to the environmental sensor unit. In some embodiments, base stations also may contain such ports and, in addition to providing functionality of a base station, may provide functionality of an environmental sensor unit. The environmental sensor unit may be adapted to determine a type of each environmental sensor connected to a port. The system may respond to sensor data based on the indicated type of sensor from which the data was obtained. For example, when an environmental sensor is connected and provides data to the environmental sensor unit, the environmental sensor unit may perform a particular form of processing on the data from the environmental sensor, based on the type of the environmental sensor that was automatically detected.

Additionally, the environmental sensor unit and a server may communicate with one another automatically, wirelessly and via a base station, to update firmware defining the operations to be carried out by the environmental sensor unit and the processing to be performed by the environmental sensor unit on data collected by environmental sensors.

Applicant has recognized and appreciated that environments in which environmental monitoring systems are deployed are often difficult to place sensor units in. The environments may be spread over a wide area and/or may be environments that are difficult for remote servers to communicate directly with environmental sensor units because of limited ability to run wires or limited access to wireless wide area networks. Applicant has additionally recognized that, in spite of this difficulty, operators of such environments (e.g., owners or managers of such environments, or contractors or other parties working for the owners or managers) may benefit from environmental monitoring systems that can be easily and inexpensively installed and maintained. Such operators may not be experts in the installation, configuration, and maintenance of environmental monitoring systems.

Applicant has recognized and appreciated that environmental sensor units of the type described above and environmental monitoring systems including such units may provide extensive monitoring functions without requiring expert skills to install, configure and operate an environmental monitoring system. In some embodiments, environmental monitoring systems and environmental sensor units and/or base stations of the type described herein may be self-configuring upon application of power (e.g., installation of batteries), may be easy and inexpensive to expand through the easy addition of environmental sensors to ports and the addition of wireless environmental sensors to existing wireless networks, and may be self-maintaining as the environmental sensor units may automatically update firmware installed on the environmental sensors units.

Accordingly, in some embodiments, an environmental monitoring system may include one or more base stations and one or more environmental sensor units that communicate via a wireless network. Some of the base stations may include environmental sensors that monitor conditions in an environment and may include wireless transceivers that transmit data regarding the environmental conditions to a server using a wireless wide-area network (WWAN) protocol, such as a cellular protocol. Such base stations might be placed at various locations in an environment to monitor the environmental conditions. In some environments, some locations may not be able to communicate using a WWAN communication protocol due to limitations of the environment. For example, some locations inside equipment (e.g., inside a freezer unit of a restaurant) or some locations within a building (e.g., a basement) may not be able to send or receive signals using a WWAN protocol or may not be able to communicate using a WWAN protocol with sufficient quality to permit communication. Environmental sensor units at such locations, however, may able to transmit communications using a low-power WPAN protocol and may be able to use such a protocol to communicate data to a base station at a location in the environment that is able to communicate data using a WWAN protocol. Thus, in some embodiments, environmental sensor units may communicate to a base station using a wireless network operating according to a WPAN protocol. Through such low-power wireless networks of environmental sensor units, the area of an environment that can be monitored may be extended.

In some embodiments, such low-power environmental sensor units and low-power wireless networks may permit systems of environmental sensor units to be expanded more quickly and easily than other forms of environmental sensor unit. When an environment to be monitored includes one or more base stations that are able to communicate with a low-power environmental sensor unit, to monitor a new area in the environment or to monitor a different condition in the environment, a user may simply add a new low-power environmental sensor unit to a location desired to be monitored. When powered on, the added environmental sensor unit may wirelessly query the environment and automatically associate with one or more of the base station(s) present in the environment. By associating with an existing base station, the new environmental sensor unit may relay communications to a server, via the base station, regarding conditions of an environment monitored using environmental sensors of the environmental sensor unit. In such embodiments, therefore, expansion of an environmental sensor network may be achieved merely by deploying a new environmental sensor unit within range of an existing base station and providing power to the environmental sensor unit.

In view of the foregoing, described herein are various techniques for establishing systems for monitoring environmental conditions using environmental sensor units. In some embodiments, establishing such systems may include providing components (e.g., environmental sensor units and base stations) to an operator of an environment. The operator may then deploy the components in an environment and provide power to the preconfigured components. These units may not be preconfigured to communicate in a specific network, but may be preconfigured to establish communication. Once one or more environmental sensor units and one or more base stations are powered, the environmental sensor units and base stations may automatically complete a configuration of the environmental monitoring system, without operator intervention. The environmental sensor unit(s) may then begin collecting information on environmental conditions and wirelessly communicating information about the conditions to the base station(s) for relaying to a server.

In some embodiments, environmental monitoring systems operating according to techniques described herein may include one or more environmental sensor units and one or more base stations serving as relays. In some embodiments, an environmental monitoring system may additionally include one or more servers that receive data from environmental sensor units via the base stations and that transmit data to the environmental sensor units via the base stations.

Environmental sensor units may be arranged in any suitable manner to measure one or more conditions of an environment. A condition of an environment may include any suitable characteristic of the environment that may be measured, such as meteorological characteristic of the environment. An environment could be any suitable area including liquids, gases, and/or solids that may be inside a building and/or outside a building. The conditions of any liquids, gases, or solids of the environment can be measured as conditions of the environment. Temperature, air quality, humidity, soil moisture, wind speed, presence or absence of flood, voltage levels, and barometric pressure are examples of environmental conditions that may be measured. Environmental sensor units may include one or more sensors that each measures one or more conditions of the environment. In some embodiments, the environmental sensor unit may also include one or more circuits to process values produced by the environmental sensors to produce processed data. The processing performed by the circuit(s) may be based on a type of environmental sensor that produced the value(s) to be processed, and as such may be based on a type of the value. For example, different processing may be performed on a value produced by a temperature sensor than on a value produced by a moisture sensor. Upon receiving a value to be processed, the circuit(s) may determine a type of the sensor from which the value was received and select a processing to be performed based on the type.

Environmental sensor units may be arranged with environmental sensors in any suitable manner, as embodiments are not limited in this respect. In some embodiments, the sensors may be integrated with the environmental sensor unit by being located within the same housing as the environmental sensor unit and/or may be connected to the environmental sensor unit using any suitable connection point. In some embodiments, as discussed in detail below, an environmental sensor unit may include physical communication ports and environmental sensors may be connected to the unit via the ports.

In some embodiments, the environmental sensor units may communicate with the base stations via a low-power wireless communication protocol. The low-power protocol may be any suitable protocol, such as a WPAN protocol. In some embodiments that use a WPAN protocol, the ZIGBEE® protocol may be used. As discussed in detail below, in some embodiments, when an environmental sensor unit is deployed in an environment, the environmental sensor unit may associate with a base station in the environment and request that the base station relay communications from the unit to a device located outside the environment, such as a server. In some cases, where the environment may include multiple base stations with which an environmental sensor unit may associate, the environmental sensor unit may select a base station based on any suitable criteria. For example, an environmental sensor unit may receive communications from the base stations and associate with the base station having the highest signal strength. Examples of other criteria are discussed in detail below.

Base stations may communicate with a server or any other suitable computing device via any suitable wired or wireless communication protocol. In some embodiments, the base stations may communicate with the server using a higher-power (as compared to the low-power communication protocol used by the base stations and environmental sensor units) wireless communication protocol, such as a WWAN protocol like a cellular communication protocol. The higher-power wireless communication protocol may permit the base station to communicate information outside the environment of the environmental sensor unit(s). When data is received from an environmental sensor unit, such as data regarding an environmental condition, the base station may communicate that data to a server using the communication protocol. When a response is received by the base station from the server using the communication protocol, the response may be transmitted by the base station to the sensor unit using the low-power wireless communication protocol.

Communications that are transmitted according to the communication protocols may be formatted in any suitable manner and may include any suitable data. The protocol may include information, passed through the base station, that allows a server to determine the type and location of an environmental sensor from which environmental monitoring data was collected. In some embodiments, communications may be formatted according to a data communication protocol that is a stateless protocol. The stateless protocol may be used for communications between an environmental sensor unit and a base station and/or between a base station and a server. As a specific example, in some embodiments, messages may be formatted according to the User Datagram Protocol (UDP).

Various examples of environmental sensor units, base stations, and servers, and examples of ways of operating such and communicating data between them are discussed below. It should be appreciated, however, that embodiments are not limited to operating according to any of the illustrative embodiments described below and that other embodiments are possible.

FIG. 1 illustrates one example of an environmental monitoring system that monitors environmental conditions in an environment in accordance with some of the techniques described herein. The environmental monitoring system 100 may monitor any suitable environment and any suitable conditions of the environment, as embodiments are not limited in this respect. In one embodiment, for example, the environmental monitoring system 100 may monitor, for a restaurant environment, a temperature, humidity, or other environmental condition of food storage units such as refrigerators. The environment may be an indoor or outdoor environment, such as may occur in an agricultural setting.

The environmental monitoring system 100 includes multiple components. The environmental monitoring system 100 may include multiple environmental sensor units 102, each of which includes one or more environmental sensors to monitor conditions of the environment. The environmental monitoring system 100 may further include a base station 104 that, in some embodiments, may also include one or more environmental sensors to monitor conditions of the environment. The server 108, which may manage a data storage 108A, may also form a part of the environmental monitoring system 100. The environmental sensor units and base stations of the environmental monitoring system 100 are disposed in the environment that is monitored. As used herein, an environmental monitoring system is said to be deployed in the environment in which the environmental sensor units and base stations of the system 100 are located, regardless of the location of server 108.

The environmental sensor units 102 may communicate to the base station 104 via a communication network 106 in which data is communicated according to a low-power wireless communication protocol. The low-power wireless communication protocol may be, for example, a wireless personal area network (WPAN) protocol that communicates information via a wireless personal area network (WPAN). The low-power wireless communication protocol may be considered low-power because the wireless communication protocol uses a power level that provides a limited range of communication, such as 100 meters or less. In some embodiments, the range for low-power communications may be approximately equal to or, in some embodiments, less than, dimensions of the environment in which the environmental monitoring system is deployed. One example of a WPAN protocol that may be implemented by some embodiments is the ZIGBEE® protocol. When the environmental sensor unit collects data regarding one or more environmental conditions of the environment, the environmental sensor unit may wirelessly transmit the data to the base station 104 using the low-power wireless communication protocol. Though, communications between the environmental sensor units and a base station may also be considered low power because of the amount of data transmitted or frequency with which data is transmitted is low.

The base station 104 is equipped to wirelessly communicate with both the environmental sensor units 102 and the server 108. The base station 104 may act as a relay to enable environmental sensor units 102 to communicate with the server 108. The base station 104 may communicate with the environmental sensor units 102 via the low-power wireless communication protocol and may communicate to the server, via a higher-power wireless communication protocol that communicates information via a wireless network. The higher-power wireless communication protocol may be, for example, a wireless wide area network (WWAN) protocol or a wireless local area network (WLAN) protocol. The wide-area wireless communication protocol may be considered higher-power because the wireless communication protocol uses more energy than the low-power wireless communication protocol discussed above and/or because the higher-power wireless communication protocol permits communications to be transmitted outside of the environment in which the environmental monitoring system is deployed. An example of a WWAN protocol that may be used in some embodiments is a cellular network protocol that communicates information via a cellular network. An example of a WLAN protocol that may be used is the Institute for Electrical and Electronics Engineers (IEEE) 802.11 protocol that communicates information via a wireless local area network (WLAN).

The base station 104 may wirelessly communicate with the server 108 via the communication network 110. The communication network 110 includes a wireless communication network that operates according to the higher-power wireless communication protocol (e.g., a cellular network and/or a WLAN) and may, in some cases, additionally include any other wired and/or wireless communication media, including the Internet. When the base station 104 receives a communication from an environmental sensor unit 102 via the communication network 106 that is intended for the server 108, the base station 104 may transmit the communication to the server 108 via the communication network 110. Similarly, when the base station 104 receives a communication from the server 108 via the communication network 110 that is intended for an environmental sensor unit 102, the base station 104 may transmit the communication to the environmental sensor unit 102 via the communication network 106.

In this way, the environmental sensor units 102 may measure conditions in the environment in which the environmental monitoring system is located and transmit data regarding the conditions to the server 108. The server 108, upon receiving the data from the environmental sensor units, may process the data in any suitable manner and store the data in the data store 108A. The server 108 may process the data received from the environmental sensor unit 102 to determine whether the data received from the environmental sensor unit 102 indicates that the condition of the environment to which the data relates is outside of an acceptable operating range.

In some embodiments, server 108 may be operated by an environmental monitoring service provider. Server 108 may contain information associated with multiple customer accounts. Each customer may deploy sensors throughout an environment and provide information about expected and/or abnormal environmental conditions. This information may be expressed as thresholds of values of environmental conditions, thresholds for rates of change of environmental conditions, thresholds for combinations of values for multiple environmental conditions or in any other suitable way. Additionally, the information may indicate an action to be taken if the abnormal operating condition or other trigger condition is met. Additional details regarding servers and techniques for processing data regarding environmental conditions that may be used in some embodiments are available in U.S. Pat. No. 7,952,485, filed on Nov. 21, 2008, by Schechter et al. and titled "Remote monitoring system" ("the '485 patent") and U.S. patent application Ser. No. 12/275, 971, filed on Nov. 21, 2008, by Schechter et al. and titled "Remote monitoring system" ("the '971 application"), the disclosures of which are incorporated herein by reference in its entirety. Any terminology used herein that conflicts with terminology used in the '485 patent and the '971 application should be accorded a meaning most consistent with the use of the terminology herein.

As an example of an action, the server may raise an alarm when operation outside of an acceptable operating range is detected. In some embodiments, the alert may be carried out through automatically making a telephone call and presenting an audible message to a user and/or by sending a text message to a user such as an SMS message or an email message.

In other embodiments, raising the alert may include presenting information regarding the alert and the condition, via a user interface of the environmental monitoring system. The user interface of the environmental monitoring system may be any suitable user interface presented to a user in any suitable manner, including an audible user interface, a visual user interface, and/or an audiovisual user interface. In some cases, the user interface of the environmental monitoring system may be presented on a computing device connected to the server 108 via the communication network 110.

For example, the user interface may be presented on a computing device 112 coupled to server 108 via a network, which may be same network used to communicate sensor data or a different network. A user may view the user interface on computing device 112 and view information regarding the alert raised by the server 108. The user may then take action regarding the condition of the environment, such as by diagnosing a cause of the environmental condition being outside acceptable operating range and resolving the cause. It should be appreciated that while the computing device 112 is illustrated in FIG. 1 as a desktop personal computer, any suitable computing device may serve as the computing device one, 12, including a laptop personal computer, a smart phone, or any other device. In addition to presenting information regarding alerts, in some embodiments the user interface may be adapted to retrieve data from the data store 108A and present information to user regarding the data, such that a user is able to review the data regarding conditions of the environment.

The information regarding the data may be presented to a user in any suitable manner, as embodiments are not limited in this respect. In some embodiments, that data may be presented in a user interface that presents data using a visual representation of the environment that is monitored. A user interface that presents a visual representation of the environment is described in U.S. patent application Ser. No. 13/340,051, filed on Dec. 29, 2011, and titled "Presenting information regarding conditions of an environment with a visual representation of the environment" ("the '051 application"). The '051 application is hereby incorporated herein by reference in its entirety. Any terminology used herein that conflicts with terminology used in the '051 application should be accorded a meaning most consistent with the use of the terminology herein.

Figure 2:
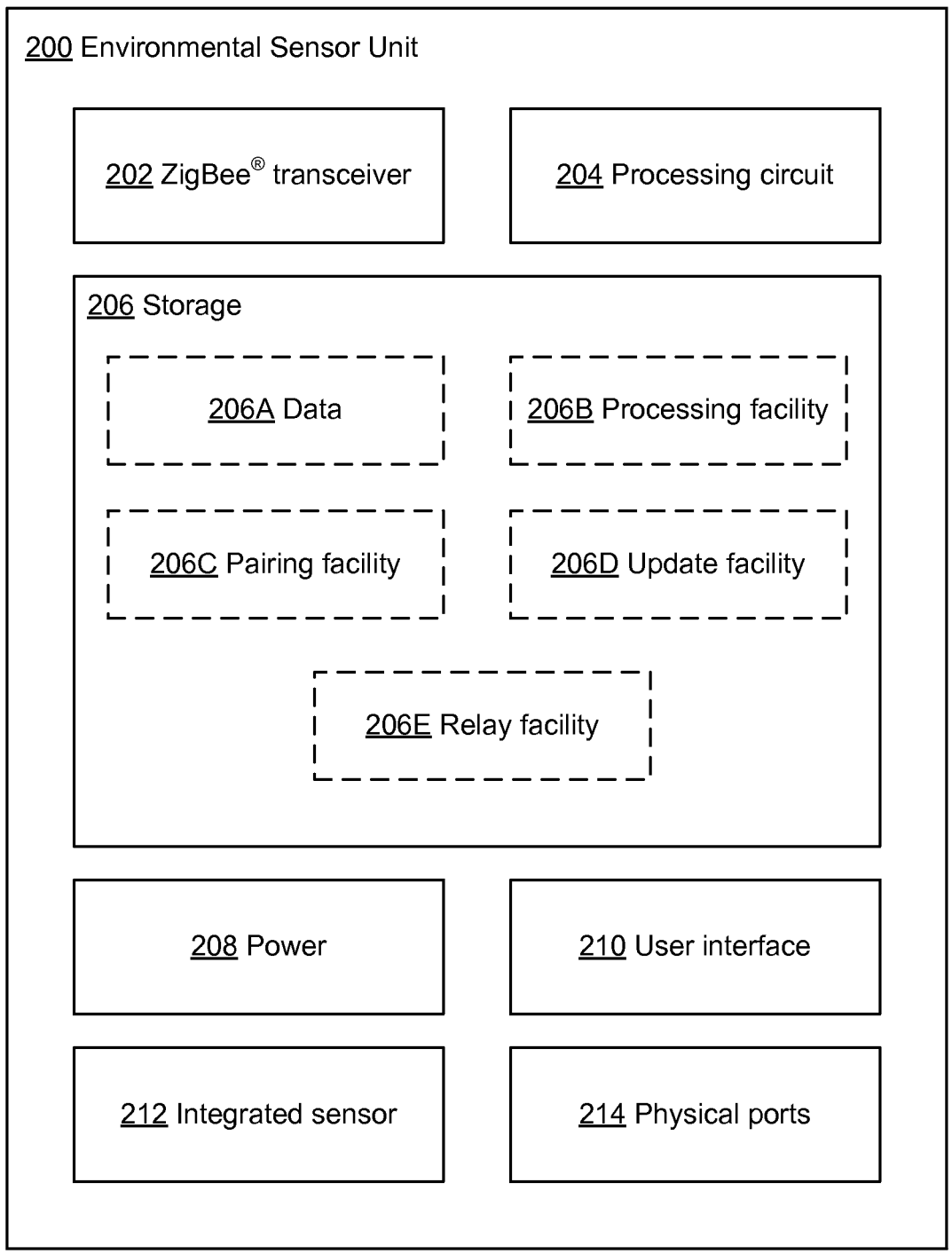
FIG. 2 is a block diagram of some components that may be included in an exemplary embodiment of an environmental sensor unit.
Figure 3:
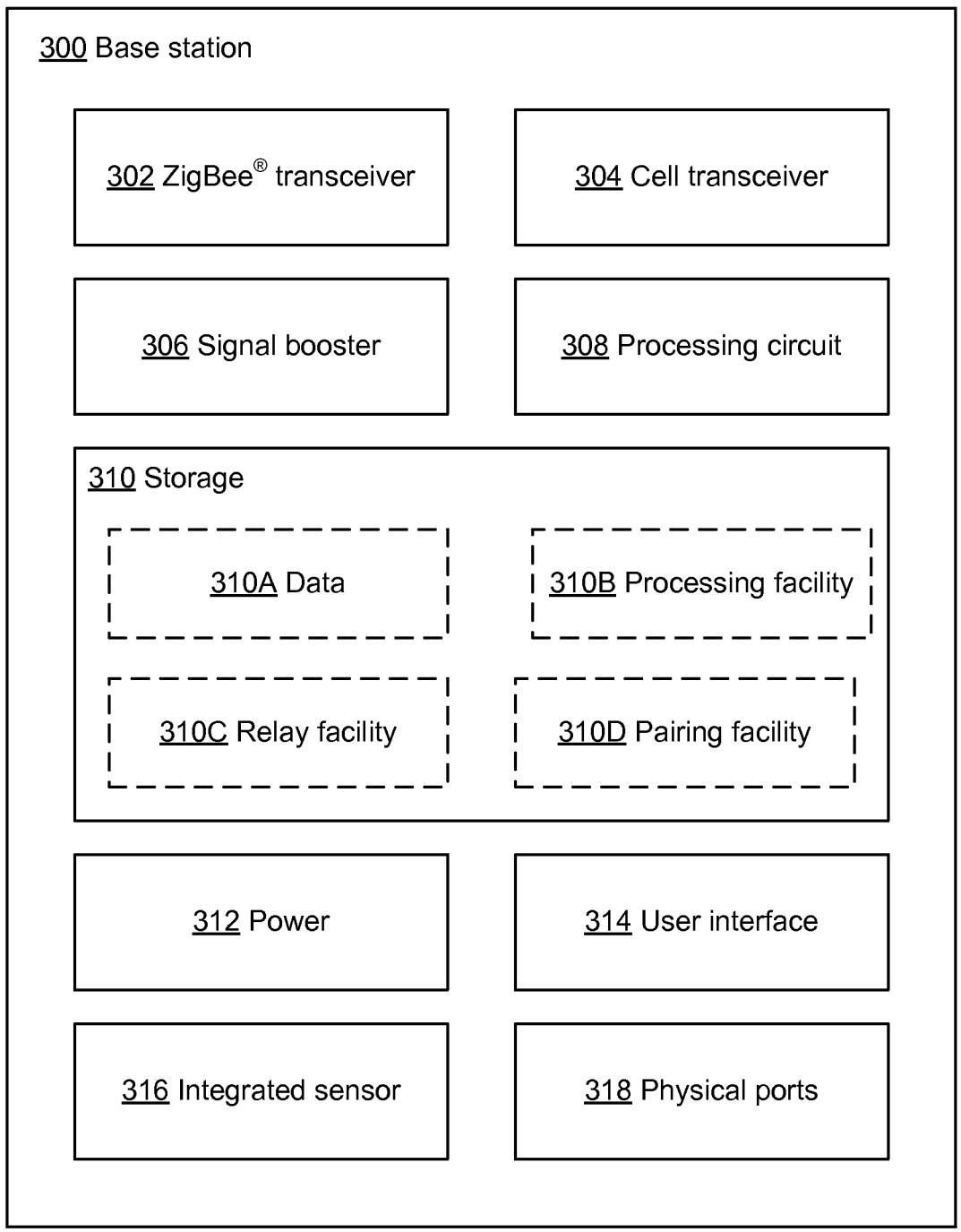
FIG. 3 is a block diagram of some components that may be included in an exemplary embodiment of a base station.

FIGS. 2 and 3 are block diagrams of exemplary devices that may act as environmental sensor units and base stations in accordance with some techniques described herein. It should be appreciated, however, that embodiments are not limited to, implementing environmental sensor units and base stations according to the examples of FIGS. 2 and 3, and that any suitable device may be used.

The environmental sensor unit 200 in the example of FIG. 2 includes a wireless transceiver 202 that operates according to the ZIGBEE® wireless communication protocol. The transceiver 202 is able to communicate data from the environmental sensor unit 200 and receives data communicated to the environmental sensor unit 200. Data that is communicated from the environmental sensor unit 200 may include data regarding one or more conditions of an environment monitored using one or more environmental sensors of the environmental sensor unit 200. Data that is communicated to the environmental sensor unit may include, for example, acknowledgements of receipt of data, commands to establish a reporting time for sensor data or updates to programming within of the sensor unit.

The wireless transceiver 202 may be operated by a processing circuit 204 to send and receive data for the environmental sensor unit 200. The processing circuit 204 may execute instructions stored in a storage 206 and process data stored in the storage 206. The data stored in the storage 206 may include data 206A, which includes data collected by one or more environmental sensors of the environmental sensor unit 200. The instructions stored in the storage 206 that may be executed by the processing circuit 204 to carry out operations for the environmental sensor unit 200 may include a processing facility 206B, a pairing facility 206C, and an update facility 206B.

In the illustrated embodiment in which each of the facilities is implemented by a processor executing stored computer-executable instructions, processing circuit 204 may execute the processing facility 206B to perform processing on data that has been collected by one or more environmental sensor units and that is to be transmitted from the environmental sensor unit 200 by wireless transceiver 202. As discussed in detail below in connection with FIG. 7, the processing facility 206B may cause the environmental sensor unit to perform multiple different types of processing on data collected by environmental sensors. The processing facility 206B may cause the environmental sensor unit to select a processing to be carried out on data collected by an environmental sensor based on a type of the environmental sensor, which identifies an environmental condition to which the data relates. Any suitable type of processing may be performed. In some embodiments, processing may entail determining when and whether to transmit a sensor measurement. For example, in some embodiments, a sensor unit may transmit sensor readings at scheduled times such that processing may entail tracking whether a scheduled time has been reached and, if so, transmitting a sensor reading. In other embodiments, processing may involve multiple sensor measurements. For example, processing may entail computing an average value of a sensor over a period of time. As yet another example, the processing may entail determining occurrence of one or more conditions, such as whether a sensor value exceeds a threshold or otherwise meets a condition communicated to the sensor unit.

The processing circuit 204 may execute the pairing facility 206C to associate the environmental sensor unit 200 with another device of an environmental monitoring system of which the environmental sensor unit 200 forms a part. As discussed in detail below in connection with FIGS. 6A and 6B, the pairing facility 206C, when executed, causes the environmental sensor unit to communicate with base stations and/or environmental sensor units within range of the wireless transceiver 202 to select one of the base stations or environmental sensor units via which the environmental sensor unit 200 will transmit data to a server of the environmental monitoring system.

The processing circuit 204 may execute the update facility 206D to update instructions stored on the storage 206, including the facilities 206B, 206C, and 206D. As discussed in detail below in connection with FIG. 9A, the update facility 206 may cause the environmental sensor unit to install an update to the instructions stored on the storage 206, such as in response to a message from the server indicating that an update is available.

The processing circuit 204 may execute the relay facility 206E to receive communications transmitted to the environmental sensor unit 200 by one or more other environmental sensor units and relay those communications received from the environmental sensor units to a server. The relay facility 206E, when executed, may also cause the processing circuit 204 to receive communications transmitted by a server and relay those communications to other environmental sensor units. As discussed below in connection with FIG. 10, the relay facility 206E may cause the environmental to operate the wireless transceiver 202 to receive communications from environmental sensor units and/or from base stations and operate the wireless transceiver 202 to transmit those communications to environmental sensor units or base station.

Embodiments are not limited to implementing the processing circuit 204 or the storage 206 in any particular manner. In some embodiments, the processing circuit 204 may be implemented as any suitable circuit able to execute instructions stored in any suitable storage circuit, and storage 206 may be implemented as any such suitable storage circuit. For example, the processing circuit 204 may be implemented as a microprocessor, including as a microprocessor designed to execute a reduced instruction set, and the storage 206 may be implemented as a memory. Moreover, it should be appreciated that it is not a requirement that each facility be implemented by a processor executing stored instructions. In some embodiments, for example, the facilities may be implemented in circuitry that is configured perform the functions of the facility.

The environmental sensor unit 200 further includes a power source 208. Power source 208 may be any suitable power source, including as a source of AC power or a battery. In some embodiments, the power source 208 may include an energy harvester, such as a solar cell, a thermal energy harvester, a kinetic energy harvester, or any other component that may produce electric power from other forms of energy.

Environmental sensor unit 200 may further include a user interface 210, which may be any suitable interface for presenting information to the user. In some embodiments, to limit a power consumption associated with the user interface 210 the user interface 210 may be implemented as one or more light emitting diodes (LEDs). The user interface 210 may present information to the user by illuminating a particular LED or set of LEDs, or by displaying a particular pattern of illumination using the LEDs. The information presented via the user interface 210 may be any suitable information, such as information regarding a state of the environmental sensor unit 200 and/or a condition of the environment. The information regarding the state of the environmental sensor unit may include error information, such as an indication that the environmental sensor unit 200 is not able to communicate wirelessly with other devices of the environmental monitoring system or that the environmental sensor of the environmental sensor unit 200 is malfunctioning.

Environmental sensor unit 200 may also include one or more environmental sensors to measure conditions of the environment in which the environmental sensor unit 200 is located. The environmental sensors may include sensors to measure any suitable condition of an environment. Examples of such conditions of an environment include temperature, air quality, humidity, soil moisture, wind speed, presence or absence of flood, voltage levels, and barometric pressure. Environmental sensors of the environmental sensor unit 200 may be implemented as integrated sensors 212, or as external sensors connected to the environmental sensor unit 200 via one or more of the physical ports 214. The physical ports 214 may be implemented as wired communication ports that permit easy expansion of the environmental monitoring system. The ports 214 may permit easy expansion of the environmental monitoring system by permitting an operator of an environment to easily add sensors to an environmental sensor unit. In this way, the operator may expand the number of type of environmental conditions that can be measured. When the operator desires to add an environmental sensor, such as to monitor a different condition of the environment, the operator need only connect the new environmental sensor to a physical port of the environmental sensor unit and the environmental sensor unit may begin using the environmental sensor to collect data regarding a condition of the environment.

Environmental sensor unit 200 may include a housing including the components 202-212 discussed above, as well as including physical ports 214 that are exposed to an exterior of the housing. Environmental sensors that are integrated sensors 212 may be located within the housing and may be connected to a circuit board to which components 202-214 are connected. Environmental sensors that are external to the environmental sensor unit 200 and connected to the environmental sensor unit may be located outside of the housing.

Regardless of where the environmental sensors are disposed relative to the environmental sensor unit, when the environmental sensors measure conditions of the environment, the environmental sensors produce data regarding the environmental conditions. The data regarding the environmental conditions may be stored in the storage 206 as data 206A, and may be processed by the processing circuit 204, executing the processing facility 206B, according to the type of environmental sensor that produced the data and the environmental condition to which the data relates. Once the data is processed by the processing facility 206B, the processed data may be output to the wireless transceiver 202 and transmitted from the environmental sensor unit 200.

Regardless of the specific processing performed on data regarding an environmental condition by the processing facility 206B, in some embodiments, when the processor circuit 204 prepares processed data regarding an environmental condition for transmission from the environmental sensor unit 200, the processor circuit may provide the processed data to the wireless transceiver 202 together with an identification of a type of the environmental sensor that originally produced the data and/or an identifier for the environmental sensor unit 200. When the wireless transceiver 202 transmits the processed data, the wireless transceiver may also transmit the identification of the sensor type. Additionally or alternatively, the processor circuit 204 may provide the data to be communicated from the environmental sensor unit 200 by the wireless transceiver 202 together with an identifier for a base station or environmental sensor unit with which the environmental sensor unit 200 is associated. The wireless transceiver 202 may then communicate the data together with the identifier for the associated device. As discussed in greater detail below in connection with FIGS. 8 and 10, by including in the communication an identifier for the device with which the environmental sensor unit 200 is associated, the associated device may detect the identifier in the communication and determine that the communicated is intended for the associated device. When the associated device determines that the communication is intended for the associated device, the associated device may relay the communication to a server.

While not illustrated in FIG. 2, in some embodiments an environmental sensor unit may further include one or more components that can be used to aid in preventing environmental conditions from straying outside environmental operating conditions or that may be used to move an environmental condition back within an acceptable operating range. For example, when a temperature of an environment increases and is above an acceptable operating range, in some environments a fan may be useful in increasing air flow in the environment, which may lower the temperature. Similarly, if a temperature of an environment decreases and is lower than an acceptable operating range, a heating unit may be useful to increase the temperature. In some embodiments, an environmental sensor unit may include components by which the environmental sensor unit can control devices to address environmental conditions, where such devices may include fans, heating elements, or any other devices. Such devices may be operated by actuators, such as electrical relays, that are controlled by a sensor unit.

These actuators may be incorporated into the environmental sensor unit or may be external to the environmental sensor unit and controllable by the environmental sensor unit. When the environmental sensor unit detects that an environmental condition is outside an acceptable operating range, such as when a server informs the environmental sensor unit of such, the environmental sensor unit may turn on and may otherwise control a device. In some embodiments in which an environmental sensor unit includes an actuator, the environmental sensor unit may control the actuator based on instructions from the server. For example, the server may instruct the environmental sensor unit to open the actuator, close the actuator, or open the actuator only if a power level of the environmental sensor unit is above a certain level (e.g., the environmental sensor unit does not have low power).

FIG. 3 illustrates one example of a base station that may be used in some embodiments of an environmental monitoring system. As discussed above, the base station may act as a relay device to communicate with one or more environmental sensor units and one or more servers and pass communications between the environment sensor units and the servers. Accordingly, the base station 300 of FIG. 3 includes two wireless transceivers 302, 304. The base station 300 includes a wireless transceiver 302 that, in this example, operates according to the ZIGBEE® wireless communication protocol, and may be implemented similarly to the wireless transceiver 202 discussed above in connection with FIG. 2.

The base station 300 additionally includes a cell transceiver 304 that operates according to a cellular wireless communication protocol, such as the General Packet Radio Service (GPRS) that operates together with a Global System for Mobile Communications (GSM) protocol for communicating information via a cellular network. While not illustrated in FIG. 3, it should be appreciated that in some embodiments the base station 300 may include a wireless transceiver operating according to a WLAN protocol, such as an IEEE 802.11 protocol, that communicates information via a wireless local area network. In embodiments that include a WLAN wireless transceiver, the WLAN wireless transceiver may be implemented instead of or in addition to the cell transceiver 304. As illustrated in FIG. 3, the base station 300 may also include a signal booster circuit 306. The signal booster circuit 306 may operate to increase the detectability of communications transmitted to the base station 300 and/or to extend the range of communications transmitted from the base station 300. In some cases, the signal booster circuit 306 may be used together with the wireless transceiver 302, which operates according to a low-power wireless communication protocol, to increase the ability of the base station 300 to detect communications from environmental sensor units located far from the base station 300.

The base station 300 may additionally include components 308-318, which may be implemented in the manner described above in connection with corresponding components of the environmental sensor unit 200 of FIG. 2. For example, the power source 312 of the base station 300 may be implemented in the base station 300 according to the description provided above of power source 208 of FIG. 2, though the power source 312 may be specifically implemented in embodiments in a manner that is different from a specific implementation of the power source 208. Therefore, for the sake of brevity, a detailed description of components 308-318 of base station 300 is not duplicated here.

The storage 310 of the base station 300 stores data to be processed by the processing circuit 308 and instructions to be executed by the processing circuit 308. The data stored by the storage 310 includes data 310A, which may include data received from one or more environmental sensor units and/or data received from one or more environmental sensors of the base station 300. The instructions stored by the storage 310 may include a processing facility 310B, a relay facility 310C, and a pairing facility 310D. The processing facility 310B and relay facility 310C may operate similarly to the facilities 206B, 206E of FIG. 2 discussed above. As discussed below in detail in connection with FIG. 10, the relay facility 310B may cause the base station to operate the wireless transceiver 302 to receive communications from the environmental sensor units and operate the wireless transceiver 304 to transmit those communications to the server.

In some embodiments, the base station 300 may only relay to the server communications received by the base station 300 from environmental sensor units with which the base station 300 is associated. To associate with one or more environmental sensor units, the processing circuit 308 may execute the pairing facility 310C. As discussed in detail below in connection with FIGS. 6A and 6B, when executing the pairing facility 310C, the base station may receive a query message from an environmental sensor unit requesting that base stations within wireless communication range of the environmental sensor unit responds to the queries. In response to receiving such a query, the pairing facility 310C may cause the wireless transceiver 302 to transmit a response to the environmental sensor unit identifying the base station 300.

As discussed above, it should be appreciated that embodiments are not limited to implementing an environmental sensor unit and a base station according to the examples discussed above in connection with FIGS. 2-3, and that embodiments may incorporate an environmental sensor unit and base station using any suitable device.

Described below in connection with the flow charts of FIGS. 4-11 are examples of various processes that may be carried out in connection with environmental monitoring systems that operate according to techniques described herein. The processes of FIGS. 4-11 may be used with any suitable environmental monitoring system, including environmental monitoring systems including devices according to the examples of FIGS. 1-3.

Figure 4:
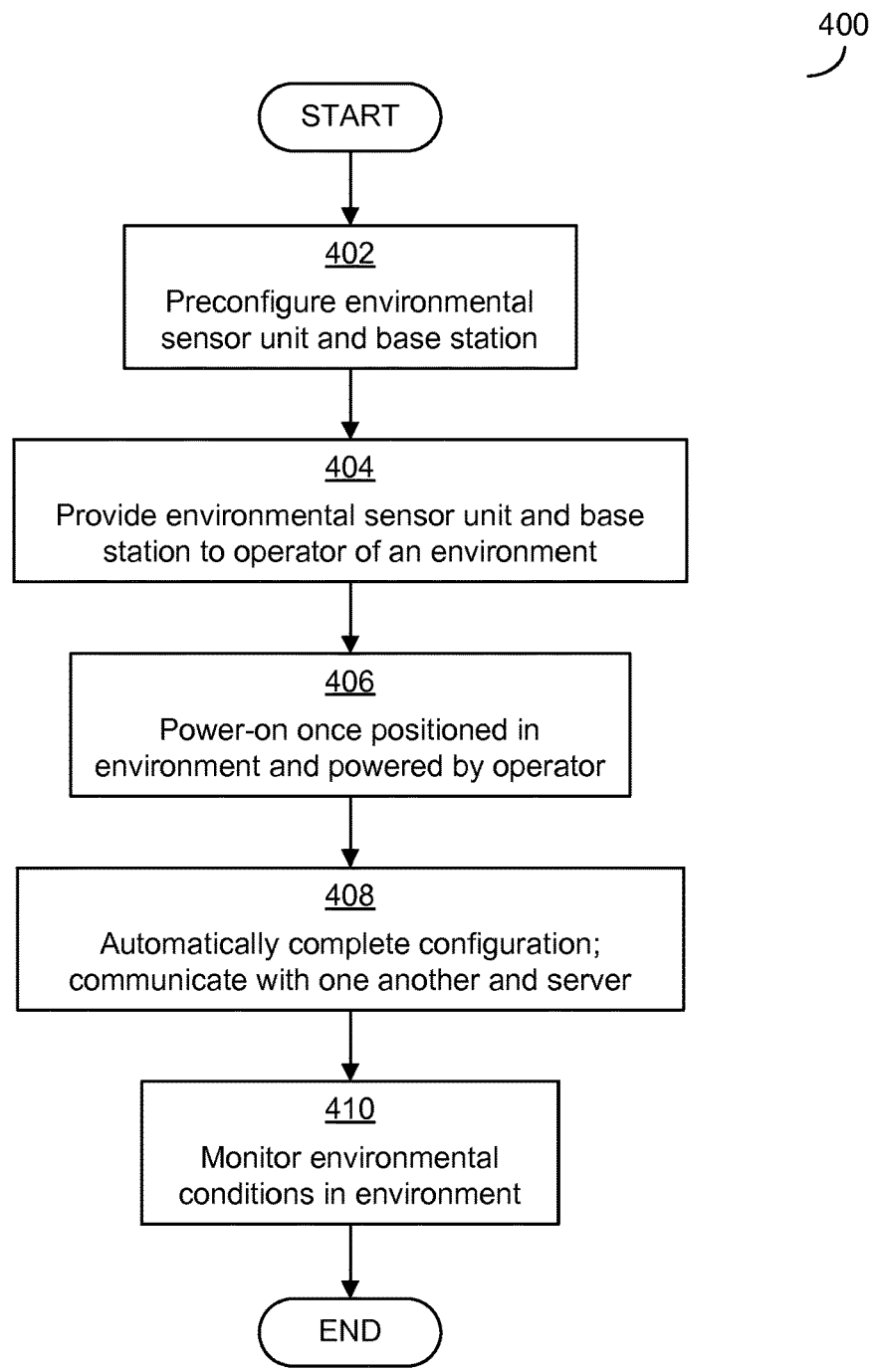
FIG. 4 is a flowchart of an exemplary process of installing and configuring an environmental monitoring system in an environment.

As discussed above, operators of environments may require that an environmental monitoring system be able to be installed and configured by a layperson and/or with little effort and expense. FIG. 4 illustrates a process that may be carried out in some embodiments for installing an environmental monitoring system in an environment, and configuring the environmental monitoring system with limited configuration input to the environmental sensor unit(s) and base station(s) from an operator of the environment in which the environmental monitoring system is installed. The process of FIG. 4 is discussed in terms of an environmental monitoring system with one sensor unit and one base station, but it should be appreciated that an environmental monitoring system may include multiple sensor units and/or multiple base stations.

Process 400 of FIG. 4 begins in block 402, in which a distributor of environmental monitoring systems configures an environmental sensor unit and a base station to operate in dynamically discovered roles. The distributor may be a designer and/or manufacturer of the environmental monitoring system. Configuring the environmental sensor unit and base station may include any suitable acts of separately configuring the environmental sensor unit and base station. For example, the preconfiguring may include storing in storage of the environmental sensor unit and base station instructions to be executed by processing circuits of the environmental sensor unit and base station, such as the facilities described above in connection with FIGS. 2-3. In the example of FIG. 4, the configuring performed by the distributor in block 402 does not include storing in this specific environmental sensor unit information regarding this specific base system base station, nor does the preconfiguring includes storing in this specific base station information regarding this specific environmental sensor unit. An environmental sensor unit may store information generally regarding base stations, but may not include information specifically regarding this base station, and vice versa. Accordingly, when the distributor configures the environmental sensor unit and the base station in block 402, the configuration of these components is done separately and the environmental sensor unit and base station are not associated.

In block 404, the distributor provides the environmental sensor unit and base station to an operator of an environment. As discussed above, the operator of an environment may be an owner of the environment and/or a manager of the environment. In block 404, the distributor may provide the environmental sensor unit and base station to the operator in any suitable manner, such as by shipping the environmental sensor unit and base station to the operator in response to a purchase made by the operator from the distributor.

Once the operator receives the environmental sensor unit and base station from the distributor, the operator may deploy the environmental sensor unit and the base station in the environment that the operator wishes to monitor. In addition, the operator provides power to the environmental sensor unit and base station. The operator may provide power in any suitable manner. For example, the operator may provide AC power to the base station and may install a battery in an environmental sensor unit. Though, either or both types of units could be powered from batteries or from an AC power source moreover, in a system, different units of the same type may be powered from different sources.

Once the operator deploys the environmental sensor unit and base station in the environment and provides power to the environmental sensor unit and the base station, in block 406 the environmental sensor unit and the base station begin carrying out operations. In block 408, the environmental sensor unit and base station automatically complete a configuration of the environmental monitoring system. As part of the configuring of block 408, the environmental sensor unit and the base station may communicate with one another to create an association between the environmental sensor unit and the base station. Exemplary techniques for creating an association between the environmental sensor unit and a base station are described in greater detail below.

In brief, the environmental sensor unit may broadcast a message in the environment requesting that each base station within communication range of the environmental sensor unit respond with an identifier for the base station. Upon receiving such a message from the environmental sensor unit, the base station responds to the environmental sensor unit with an identifier for the base station. Based on the response received from the base station (and any responses received from any other base station), the environmental sensor unit may associate with the base station. To associate with the base station, the environmental sensor unit stores information identifying the base station and identifying that the environmental sensor unit is communicating via the base station.

Once the environmental sensor unit is associated with the base station, the environmental sensor unit may communicate through the base station with a server. That communication may include transmission to the base station, for retransmission to a server, information identifying that the environmental sensor unit is online and monitoring conditions in the environment. The environmental sensor unit may also transmit to the base station, for retransmission to the server, information regarding the environmental sensor unit, such as an identifier for the environmental sensor unit and information about the hardware and/or software of the environmental sensor unit.

Once the base station receives such information from the environmental sensor unit, the base station may retransmit the information to the server. As discussed above, communications between the environmental sensor unit and the base station may be carried out according to a low-power wireless communication protocol, such as the ZIGBEE® protocol, and communications between the base station and the server may be carried out according to a wireless communication protocol, such as a cellular network protocol.

Once the environmental sensor unit is associated with the base station and information has been transmitted to the server identifying that the environmental sensor unit and base station are online in the environment, in block 410 the environmental monitoring system may begin monitoring environmental conditions in the environment and providing data regarding the environmental conditions to the server. To monitor the environmental conditions, one or more environmental sensors of the environmental sensor unit and/or the base station may collect data regarding the environmental conditions and transmit that information to the server. The server, upon receiving the data from the environmental sensor unit and base station, may store the data in a data store of the environmental monitoring system, the server may also process the data to determine whether the data indicates that any of the environmental conditions being monitored are outside of acceptable operating ranges or otherwise indicates a state for which an alert should be generated as discussed in the '485 patent and the '971 application. If the server determines that any of the environmental conditions being monitored are outside of acceptable operating ranges or otherwise indicates a state for which an alert should be generated, the server may trigger an alert.

Once the environmental monitoring system is configured and is monitoring conditions of the environment, the process 400 ends. Following the process 400, the environmental monitoring system may continue monitoring conditions of the environment, storing data regarding the conditions on a server, and evaluating the data on the server to determine whether an alert should be triggered. Through the process 400, an operator may install the environmental monitoring system in the environment with limited effort and expense, and the environmental monitoring system may automatically configure itself.

As discussed in more detail below, while in the process 400 an environmental sensor unit associates with a base station, embodiments are not limited to forming an association between an environmental sensor unit and a base station such that the environmental sensor unit may transmit data to a server via the base station. In some embodiments, an environmental sensor unit may be configured to associate with another environmental sensor unit to transmit data to the server. This may be done, for example, when a first environmental sensor unit is not within range of a base station, but is within range of a second environmental sensor unit and the second environmental sensor unit is associated with a base station. The first environmental sensor unit may associate with the second environmental sensor unit using the techniques described above in connection with block 408 and described in greater detail below in connection with FIG. 6A. Once the first environmental sensor unit is associated with the second environmental sensor unit, the first environmental sensor unit may transmit data to the server via the second environmental sensor unit, and the second environmental sensor unit may transmit that data to the server via the base station with which the second environmental sensor unit is associated.

Figure 5:
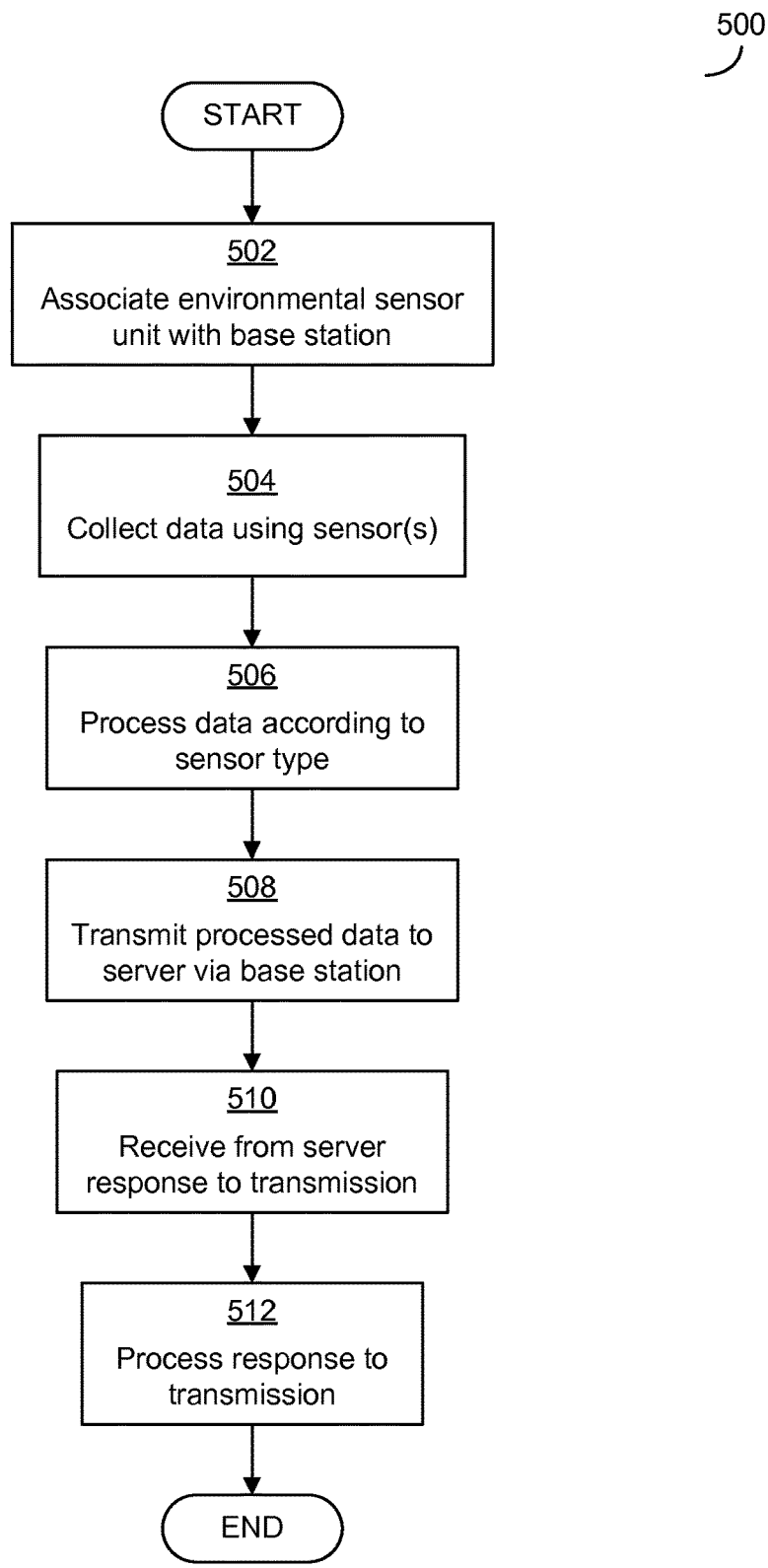
FIG. 5 is a flowchart of an exemplary process for operating an environmental sensor unit.

FIG. 5 illustrates one example of a process that may be carried out by an environmental sensor unit to monitor conditions of an environment and transmit data regarding the conditions of the environment to a server. Prior to the start of the process 500 of FIG. 5, a distributor of environmental monitoring systems provides the environmental sensor unit to an operator of the environment by, and the operator deploys the environmental sensor unit in the environment and provides the unit with power. The environment in which the environmental sensor unit is deployed also includes one or more base stations of an environmental monitoring system, which may have been deploys in the environment at the same time that the environmental sensor unit was deployed in the environment or at a prior time. In some cases, the environments may also include one or more other environmental sensor units that are also monitoring conditions of the environment and communicating with the base station to relay communications to a server.

The process 500 of FIG. 5 begins in block 502, in which the environmental sensor unit associates with a base station of the environmental monitoring system that is deployed in the environment. To associate with a base station of the environmental monitoring system, the environmental sensor unit may transmit a request, using the low-power wireless communication protocol, to devices of the environmental monitoring system that are within range of the environmental sensor unit. The request that is transmitted may be a request for the devices to respond to the environmental sensor unit identifying whether the responding device has access to the server. A device may have access to the server when the device is a base station that is able to communicate with the server using the higher-power wireless communication protocol. Alternatively, a device may have access to the server when the device is an environmental sensor unit that is associated with a base station that is able to communicate with the server. In the examples of FIG. 5, based on the responses that are received by the environmental sensor unit from base stations and environmental sensor units within range in response to the request, the environmental sensor unit selects a base station with which to associate. A more detailed discussion of operations that may be carried out as part of associating the environmental sensor unit with a base station (or an environmental sensor unit) is provided below in connection with FIGS. 6A and 6B.

In block 504, the environmental sensor unit collects data regarding one or more environmental conditions using one or more environmental sensors of the environmental sensor unit. The environmental sensors of the environmental sensor unit may be integrated with the environmental sensor unit by being positioned inside of a housing of the environmental sensor unit, or may be located external to the environmental sensor unit and connected to the environmental sensor unit via physical ports of the environmental sensor unit. As the data regarding the environment condition(s) is collected by the environmental sensor(s), the environmental sensor unit may store the data in storage of the environmental sensor unit.

In block 506, once the data is collected, the environmental sensor unit processes the data according to a type of environmental sensor with which the data was collected and the environmental conditions to which the data relates. The environmental sensor unit may be configured to perform multiple different types of processing on data collected by the environmental sensors, and the processing that is performed may be selected based on the type. The type of sensor may be dynamically determined by the environmental sensor unit based on information obtained from the sensor.

The processing that is performed may be any suitable type of processing, as embodiments are not limited in this respect. Examples of types of processing are discussed above in connection with FIG. 2. For example, the environmental sensor unit may be configured to determine an integer value or other suitable code based on a digital and/or analog value provided by an environmental sensor. To determine the integer value, the environmental sensor unit may process an analog voltage input provided by the environmental sensor and map the analog voltage input to a range of values (e.g., 0-255) and determine an integer value based on the mapping. The processing and mapping may be different for each type of environmental sensor and each environmental condition. For example, for a voltage sensor, the environmental sensor unit may process an analog voltage signal generated by a voltage sensor and generate an integer in the range of −1,000,000 to 1,000,000, where the integer corresponds to a range of voltages that is −1000 V to 1000 V. As another example, for a wind speed sensor, the environmental sensor unit may process an analog voltage signal generated by the wind speed sensor and generated an integer in the range of 0 to 10,000 corresponding to a wind speed between 0 to 100 mph. As another example of the type of processing that is performed, rather than determining an integer, the environmental sensor unit may be configured to evaluate an analog voltage input provided by the environmental sensor and generate a Boolean (e.g., true or false) value based on the evaluation. A process for selecting processing by which to evaluate data received from an environmental sensor is discussed below in greater detail in connection with FIG. 7.

In block 508, once the environmental sensor unit has processed the data collected by the environmental sensor, the environmental sensor unit transmits the processed data to a server of the environmental monitoring system, via the base station with which the environmental sensor unit associated in block 502. To transmit the processed data to the server of the environmental monitoring system, the environmental sensor unit may transmit a message to the base station via a low-power wireless communication protocol, and rely on the base station to relay the processed data to the server using a wireless communication protocol that may consume more power than the low-power wireless communication protocol. In block 510, the environmental sensor unit receives from the server, via the base station, a response to the transmission of the processed data by the environmental sensor unit and, in block 512, processes the response received from the server. Exemplary processes for transmitting data to the server via the base station, receiving a response from the server via the server, and processing the response are discussed below in detail in connection with FIGS. 8-9.

Once the environmental sensor unit processes the response from the server in block 512, the process 500 ends. Following the process 500, the environmental sensor unit may perform all or part of the process 500 again. For example, the environmental sensor unit may continue collecting data regarding environmental conditions, processing the data, and transmitting the data to the server. As another example, the environmental sensor unit may associate with a new base station prior to collecting data regarding environmental conditions, processing the data, and transmitting the data to the server as discussed below in connection with FIG. 6B. Additionally, following the process 500, the server to which the processed data was transmitted in block 508 may store the processed data in a data store of the server and may further process the data in any suitable manner, such as to determine whether an alert should be raised regarding an environmental condition to which the data relates.

Figure 6A:
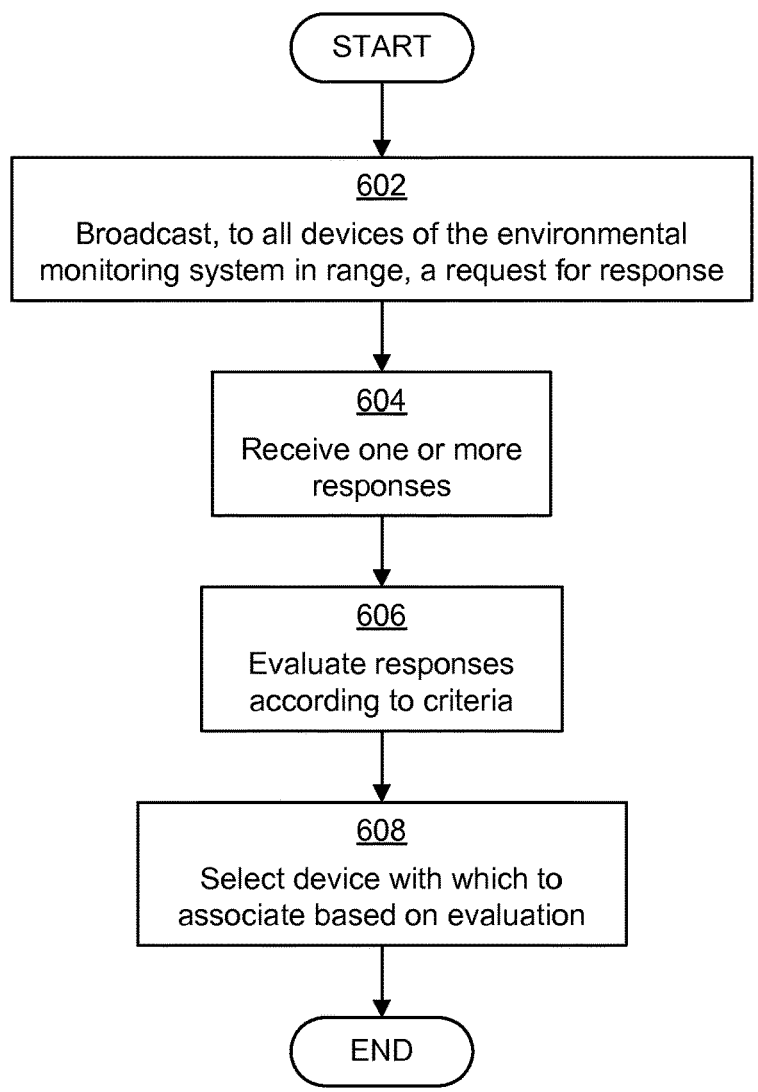
FIGS. 6A and 6B are flowcharts of exemplary processes for associating environmental sensor units with base stations.
Figure 6B:
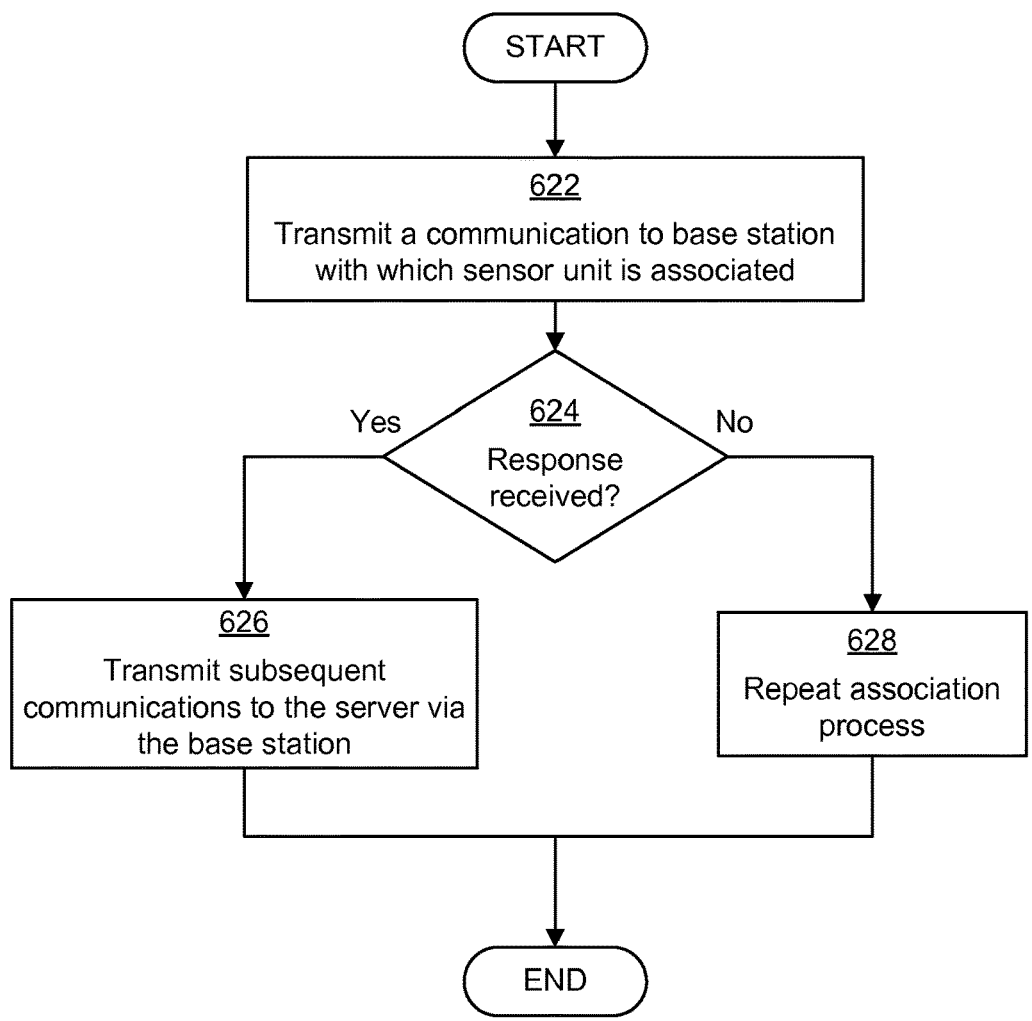

As mentioned above in connection with block 502 of FIG. 5, an environmental sensor unit may associate with another device (e.g., a base station or another environmental sensor unit) to transmit data to the server via the base station or other environmental sensor unit with which the environmental sensor unit associated. The environmental sensor unit associates with another device of the environmental monitoring system in this way because the environmental sensor unit includes a wireless transceiver operating according to a low-power wireless communication protocol, and the environmental sensor unit may not be able to transmit data directly to the server using the low-power wireless communication protocol. FIGS. 6A and 6B illustrate processes that may be carried out by an environmental sensor unit to create such an association.

Prior to the start of process 600 of FIG. 6A, an environmental sensor unit is deployed in an environment that includes at least one base station and may include one or more other environmental sensor units. Additionally, the environmental sensor unit is provided with power and such that it collects data regarding environmental conditions of the environment.

The process 600 begins in block 602, in which the environmental sensor unit broadcasts a message unit using the low-power wireless communication protocol. The message that is broadcast in block 602 is a request that each device that receives the message respond to the message with an identifier for the device and an indication of whether the device provides access to the server. A device may provide access to the server when the device supports communication via a higher-power wireless communication protocol, such as may be the case with a base station that responds. Alternatively, a device may provide access to the server when the device is associated with another device that supports communication via the higher-power wireless communication protocol, such as may be the case with an environmental sensor unit that responds.

In block 604, the environmental sensor unit receives one or more responses from devices of the environmental monitoring system and, in block 606, evaluates the responses according to one or more criteria to select a device with which to associate. The criteria by which the responses are evaluated in block 606 may be any suitable criteria, as embodiments are not limited in this respect. In some embodiments, a criterion may relate to whether the response is received from a base station or from another environmental sensor unit, and the environmental sensor unit may apply the criterion to select base stations rather than environmental sensor units. In such embodiments, when no base stations are available, the environmental sensor unit may select another environmental sensor unit with which to associate, and transmit communications directed to the server via that other environmental sensor unit. The other environmental sensor unit that is selected in this case may be associated with another device and relay communications to the server via the other device, which may be a base station or another environmental sensor unit.

Additionally or alternatively, in some embodiments, a criterion may relate to characteristics of a link that can be established with another device, which may be determined based on a signal strength or a signal-to-noise ratio of a response received from a device, such that a device having the best communication quality, according to the signal strength or signal-to-noise ratio, may be selected from among the responding devices. In some embodiments, these two criteria may be evaluated together, such that when responses are received from multiple base stations and multiple environmental sensor units, in block 604 a base station having the best communication quality, according to the signal strength or signal-to-noise ratio, is selected.

In some embodiments, additional criteria may be used for selecting a device with which to associate. For example, in some embodiments, a response from a base station may indicate what type of wireless communication protocol is supported by the base station for relaying communications to the server, such as a cellular protocol or a WLAN protocol. In some such embodiments, the environmental sensor unit may be configured to evaluate the type of higher-power wireless communication protocol, and preferably select a base station that communicates using a WLAN protocol over a base station that communicates using a cellular protocol. This may be done because the WLAN protocol uses less power and may be more reliable than the cellular protocol. Though, it should be appreciated that embodiments are not limited to applying any particular criterion and that any suitable criteria may be used to evaluate the responses in block 606.

In block 608, based on the evaluation conducted in block 606, the environmental sensor unit selects a device with which to associate. In block 608, once the device is selected, the environmental sensor unit may store the identifier for the device, as received in the response in block 604, in a storage of the environmental sensor unit. In some embodiments, the environmental sensor unit may not notify the selected device that the environmental sensor unit has selected to associate with the device. As discussed below, the identifier for the device may then be used in transmitting data from the environmental sensor unit for relaying to the server. Alternatively or additionally, the sensor unit may notify the selected device that it has been selected as a relay device. This notification may be used in any suitable way. In some embodiments, for example, the selected device may use this notification to determine whether a response received from a server should be re-broadcast. As another example, this notification may be used to monitor for communications from an environmental sensor unit and relay those communications, even if the selected relay device is not expressly identified in the communications from the environmental sensor unit.

Once the device is selected in block 608, the process 600 ends. Following the process 600 of FIG. 6A, the environmental sensor unit is associated with another device of the environmental monitoring system and the system is configured such that data from the environmental sensor unit can be relayed to the server of the environmental monitoring system via that other device.

It should be appreciated that embodiments are not limited to implementing association processes in which an environmental sensor unit requests responses from other devices of the environmental monitoring system within range of the environmental sensor unit, as in the process 600. Rather, in some embodiments, an environmental sensor unit may monitor for communications from other devices in the environmental monitoring system. The communications may be beacon transmissions broadcast by the other devices and/or communications transmitted between the other devices to exchange data regarding environmental conditions. When the environmental sensor unit detects communications from other devices, the environmental sensor unit may evaluate the communications as discussed above in connection with block 606. Though, it should be appreciated that embodiments in which environmental sensor units request responses from other devices may be advantageous in some embodiments. For example, in some embodiments power available to devices in the environmental monitoring system (e.g., battery power) may be limited. When power is limited, requesting communications in the manner described above in connection with process 600 may reduce the number of communications transmitted and received and therefore may lower a power consumption of the environmental monitoring system.

Once the environmental sensor unit is associated with another device of the environmental monitoring system, the environmental sensor unit may maintain the association for any suitable length of time. In some embodiments, the environmental sensor unit may change the association when one or more conditions are met. These may be any suitable conditions. For example, an environmental sensor unit may change the association after a length of time has passed. As another example, an environmental sensor unit may change the association when the environmental sensor unit detects that the environmental sensor unit is no longer able to communicate to the server via the device with which the environmental sensor unit is associated.

FIG. 6B illustrates an example of a process that may be carried out by an environmental sensor unit to change an association when the environmental sensor unit. Prior to the start of process 620 of FIG. 6B, an environmental sensor unit has been deployed in environment and has associated with a base station of the environmental monitoring system in that environment. In some cases, the environmental sensor unit may have communicated multiple pieces of data to a server, via the associated base station, though in other cases the environmental sensor unit may not have communicated via the base station prior to the start of process 620.

The process 620 begins in block 622, in which the environmental sensor unit transmits a communication to the base station with which the sensor unit is associated, such that the base station may relay the communication to the server. The communication may include any suitable information, such as data regarding environmental conditions collected by the environmental sensor unit.

In block 624, the environmental sensor unit determines whether a response to the communication was received from server, via the base station. The determination of block 624 may be carried out in any suitable manner, such as following the passage of a certain length of time (e.g., 30 seconds). If the environmental sensor unit determines in block 624 that a response was received, then in block 626 the environmental sensor unit concludes that subsequent communications should be transmitted to the server via the base station and the process 620 ends.

If, however, the environmental sensor unit determines in block 624 that no response from the server was received, then in block 628 the environmental sensor unit may repeat the association process so as to change the device with which the environmental sensor unit is associated. For example, the environmental sensor unit may carry out the process 600 of FIG. 6A in response to determining in block 624 that no response was received.

In some embodiments, when changing the association of the environmental sensor unit, the environmental sensor unit may not communicate a disassociation message to a device with which the environmental sensor unit was previously associated. This may be done because the associated device may not be aware that the environmental sensor unit has associated with the device. As discussed above, when the association is created, the environmental sensor unit may locally store a record of the association, but may not send a message to the selected device about the association. The environmental sensor unit may repeat the association process and remove the identifier for the device with which the environmental sensor unit was previously associated from the storage of the environmental sensor unit. Once the environmental sensor unit determines that the association process is to be repeated, the process 620 ends.

Through the association processes described above in connection with FIGS. 6A and 6B, an environmental sensor unit may automatically form an association with a base station located in an environment and transmit data from the environmental sensor unit to a remote server via the associated base station. This may be carried out without input by an operator of an environment in which the environmental sensor unit is disposed. As such, the association processes of FIGS. 6A and 6B permit easy expansion and maintenance of environmental monitoring systems. When an operator desires to expand the area of an environment covered by an environmental monitoring system, or desires to monitor an environmental condition in an environment that has not previously been monitored, the operator need only obtain a new environmental sensor unit, deploy the unit in the environment, and provide power to the unit. Once the environmental sensor unit is provided power, the environmental sensor unit may carry out the association processes described above, without input from the operator, to begin transmitting data regarding environmental conditions to a server. Additionally, if communication conditions in the environment change, such as a base station experiences a failure or an obstacle is placed between the environmental sensor unit and the base station that blocks communications, the environmental sensor unit may adapt and automatically re-associate in the environmental monitoring system. This re-association also may be carried out without input from the operator. Thus, an installation and maintenance burden associated with environmental monitoring systems that include such environmental sensor units is low.

Figure 7:
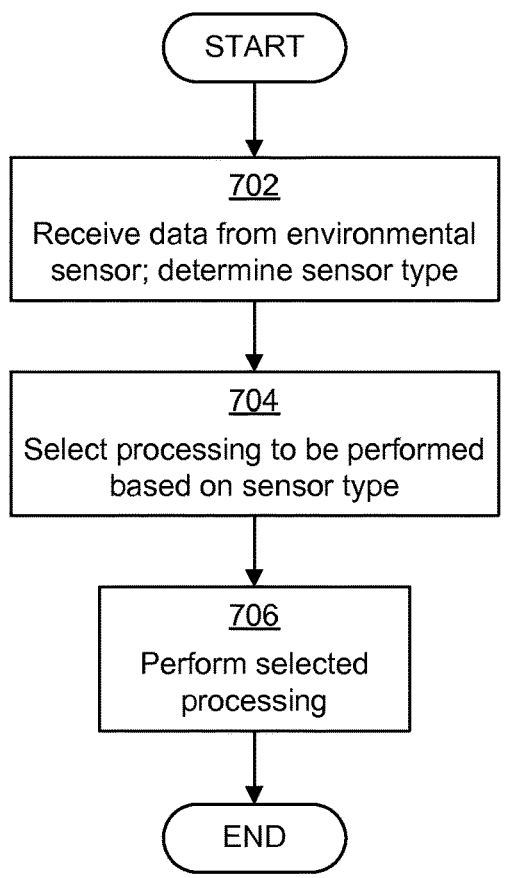
FIG. 7 is a flowchart of an exemplary process for processing values regarding an environmental condition that were produced by an environmental sensor.

When the environmental sensor unit collects data regarding an environmental condition, the environmental sensor unit may process the data prior to transmitting the data from the environmental sensor unit to the server, as discussed above in connection with block 506 of FIG. 5. The environmental sensor unit may select the processing to be performed on data regarding an environmental condition in any suitable manner. FIG. 7 illustrates an example of a process that may be carried out in some embodiments for determining processing to be carried out on data regarding an environmental condition.

Process 700 begins in block 702, in which a processing circuit of the environmental sensor unit receives data regarding an environmental conditions collected by the environmental sensor of the environmental sensor unit. When the processor circuit receives the data, the processor circuit may store the data in a storage of the environmental sensor unit. In block 702, the environmental sensor unit may further identify the type of the sensor from which the data was received. The type of the sensor may be determined in any suitable manner, as embodiments are not limited in this respect. In some embodiments, the environmental sensor may communicate an identifier for the sensor together with the data when the data is provided to the processor circuit of the environmental sensor unit. The identifier for the sensor may indicate a type of the sensor, such as whether the sensor is a temperature sensor, a wind speed sensor, a humidity sensor, etc. Because the identifier for the sensor identifies a type of the sensor, the identifier for the sensor may also indicate an environmental condition to which the collected data relates. In other embodiments, the processing facility may identify a processor pin or physical port by which the data was received and may determine, from information stored by the environmental sensor unit, an environmental sensor connected to that pin or port. The information stored by the environmental sensor unit may include an identifier for the environmental sensor and/or an indication of the type of the environmental sensor that was previously received from the environmental sensor. The identifier or type may have been previously received from the environmental sensor when, for example, the sensor was first connected to the environmental sensor unit or the environmental sensor unit was powered on.

Identifying processing to be performed by first determining a type of environmental sensor connected to a pin/port or from which data was received, rather than by having a fixed configuration that performs a particular type of processing every time data is received via a particular port or pin, may be advantageous. In particular, identifying the type of environmental sensor permits an operator of the environment to update or expand an environmental monitoring system by adding environmental sensors to an environmental sensor unit, such as by connecting sensors to physical ports of the environmental sensor unit. Once the environmental sensor is connected, the environmental sensor unit may receive data from the environmental sensor and may process the data automatically, by identifying the type of the environmental sensor. An operator therefore may not be required to perform any configuration of the environmental sensor unit when connecting an environmental sensor.

In block 704, the processing facility selects processing to be performed on the data received in block 702. The processing facility selects the processing based on the type of sensor that was determined in block 702. The processing that is selected in block 704 may be one type of processing from among multiple types of processing with which the environmental sensor unit may be configured. In some embodiments, the environmental sensor unit may be configured with multiple different forms of processing, and each type of processing may be associated with one or more types of environmental sensor that can form a part of the environmental sensor unit and/or be connected to the environmental sensor unit. In such embodiments, in block 704, the processing that is selected is processing that corresponds to the type of environmental sensor from which the data was received in block 702.

In block 706, once the processing is selected, the processing facility performs the selected processing on the data received in block 702. It should be appreciated that embodiments are not limited to performing any particular type of processing on data received from the environmental sensor, but rather that any suitable processing may be performed. Examples of processing that may be performed by the environmental sensor unit are discussed above in connection with FIG. 2 for example, the processing may include determining an average value for an environmental condition over time, determining whether a value of an environmental condition meets a threshold or other condition, and determining an integer value or a Boolean value based on an analog voltage signal received from and environmental sensor, but it should be appreciated that other forms of processing are possible.

Once the processing is performed on the data in block 706, the processing may be stored in storage of the environmental sensor unit, and the process 700 ends. Following the process 700, the environmental sensor unit stores a processed form of data regarding an environmental condition. The processed data may then be transmitted from the environmental sensor unit to a server by transmitting the processed data, using a low-power wireless communication protocol, to a base station for relating to the server.

Environmental sensor units may communicate with servers, via base stations, in any suitable manner, as embodiments are not limited in this respect. FIGS. 8-9 illustrate two illustrative processes that may be carried out in some embodiments for communicating between an environmental sensor unit and a server.

Figure 8A:
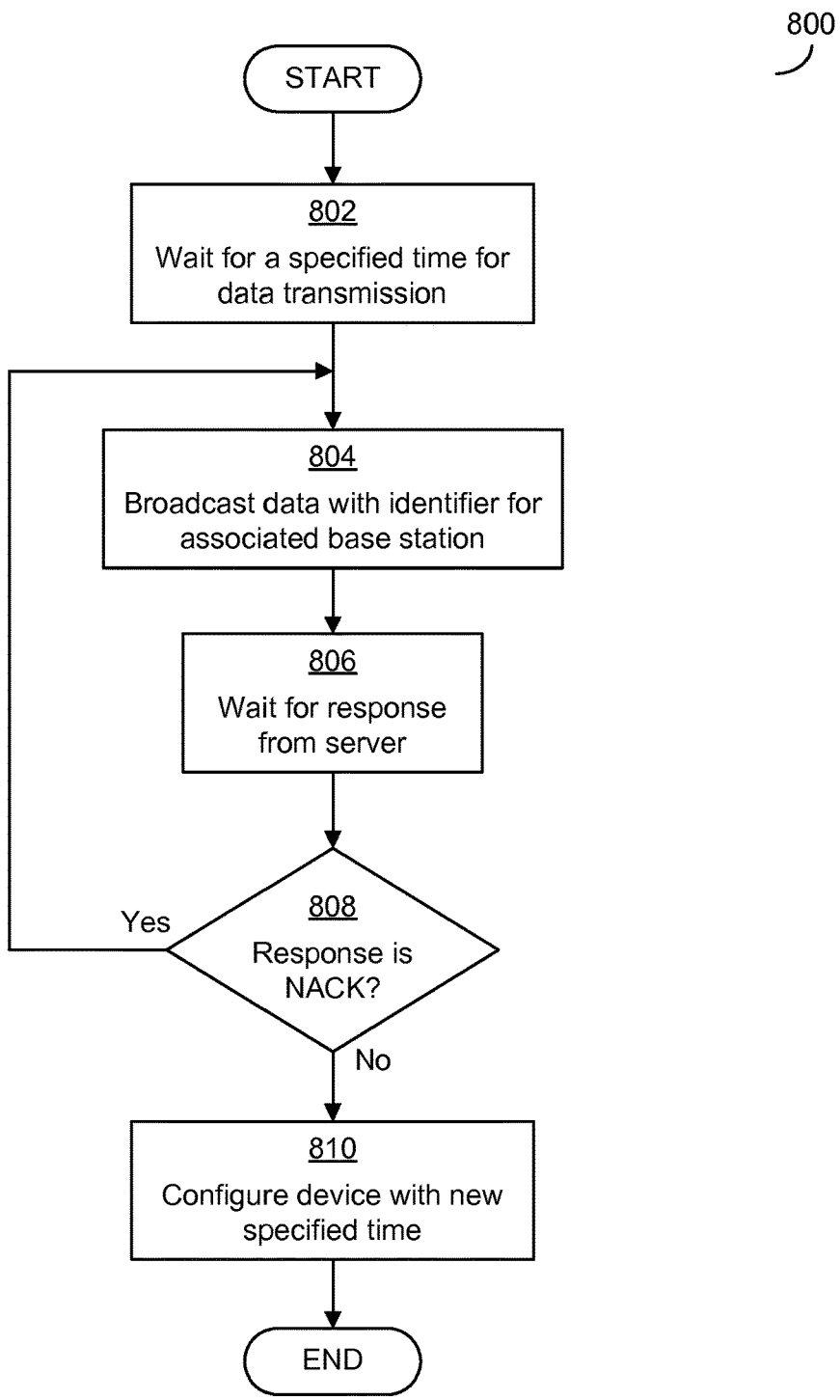
FIG. 8A is a flowchart of an exemplary process for transmitting data from an environmental sensor unit.

The process 800 of FIG. 8A illustrates a process that may be used for communicating data regarding an environmental condition between an environmental sensor unit and a server. Prior to the start of the process 800, an environmental sensor unit is deployed in an environment, associates with a base station that is also deployed in the environment, collects data regarding one or more environmental conditions of the environment, and stores the data for transmission to the server. In addition, prior to the start of the process 800, the environmental sensor unit may have previously transmitted information regarding the environmental sensor unit and/or data regarding an environmental condition, and received from the server and instructions to subsequently transmit data following expiration of length of time identified by the server.

The process 800 begins in block 802, in which the environmental sensor unit waits for a specified time to transmit data regarding the environmental conditions to the server. In the embodiment of FIG. 8A, an environmental sensor unit may transmit data to the server at specified intervals, where the intervals are specified by the server. Accordingly, rather than transmitting data to the server as the data is collected by environmental sensors and processed by the environmental sensor unit, the environmental sensor unit may store data regarding environmental conditions in a storage of the environmental sensor unit until the time at which the environmental sensor unit is to transmit the data to the server.

At the time that the environmental sensor unit is to transmit data to the server, the environmental sensor unit operates the low-power wireless transceiver of the environmental sensor unit to transmit the data from the environmental sensor unit to a device (e.g., a base station) with which the environmental sensor unit is associated. As discussed above, when the environmental sensor unit associates with a device, the environmental sensor unit may store an identifier for the device with which the environmental sensor unit is associated, but may not inform a device with which the environmental sensor unit is associated that the environmental sensor unit has elected to associate with that device. To transmit the data to the device with which the environmental sensor unit is associated, the wireless transceiver may create a communication that includes in a payload both the data and the identifier for the device. The wireless transceiver may broadcast the communication such that all devices within range of the environmental sensor unit receive the communication.

In some embodiments, the wireless transceiver may include in a header of the communication an indication that the communication is being broadcast and is not directed at any particular device. Broadcasting the communication in this way, rather than directing the communication to any particular device, may save power by allowing a simpler data communication protocol that includes less overhead messages to be used. For example, a stateless data communication protocol that does not maintain connections may be used, such as the User Datagram Protocol (UDP). Examples of communication that may be communicated using a stateless data communication protocol are described below in connection with FIGS. 12 and 13. Additionally, broadcasting communications in this way may enable simpler processing in terms of creating a communication to be transmitted, because each communication may be broadcast in the same manner, with only the payload of each communication varying.

Each device of the environmental monitoring system may be configured to review broadcast communications received from environmental sensor units and determine whether communications include an identifier for the device (i.e., its own identifier). When a device determines that a message received from environmental sensor unit includes an identifier for the device (i.e., its own identifier), the device may determine that the environmental sensor unit is associated with the device and that the device should relay the communication received from the environmental sensor unit. Such a process is described in greater detail below in connection with FIG. 10.

The communication that is broadcast by the environmental sensor unit in block 804 may include any suitable data regarding environmental conditions. As described below in greater detail in connection with FIGS. 12 and 13, a communication may include multiple pieces of data regarding environmental conditions, such as all pieces of data collected by the environmental sensor unit since a last transmission by the environmental sensor unit.

Once the data is broadcast in block 804, in block 806 the environmental sensor unit waits for a communication from the server that is transmitted in response to the data broadcast in block 804. The server may transmit a response upon receiving data transmitted to the server by a base station of the environmental monitoring system, the data having been originally transmitted by the environmental sensor unit. As discussed below in greater detail in connection with FIG. 11, the server may transmit a response that includes a negative acknowledgment (NACK) when the server determines that data received from the environmental sensor unit is invalid. The server may determine the data is invalid when there has been a transmission error and of the data is corrupted, which the server may detect using a cyclic redundancy check (CRC) or other suitable error detection technique. When the server determines that the data is valid, the server may instead transmit a response that identifies a next time at which the environmental sensor unit should transmit data. This time may be indicated in any suitable way, such as an absolute time in accordance with a common clock used by the server and other devices in the system or as a relative time indicating an amount of time until the next transmission.

Therefore, when the environmental sensor unit receives a response from the server via the base station, the environmental sensor unit may determine in block 808 whether the response is a NACK message. If the environmental sensor unit determines that the response is a NACK message, the environmental sensor unit returns to block 804 of process 800 and rebroadcasts the data. If, however, the environmental sensor unit determines that the response is not an NACK message, but instead identifies the next time, in block 810 the environmental sensor unit may configure itself with the new time specified in the response from the server. By configuring itself with the new time, the environmental sensor unit will transmit data at a future time specified by the server.

As discussed above in connection with FIG. 6B, when the environmental sensor unit determines that a response was not received from the server, the environmental sensor unit may repeat an association process to select a new device with which to associate. In this case, after selecting a device with which to associate, the environmental sensor unit may repeat the process 800 of FIG. 8A.

Once the environmental sensor unit is configured with the new time specified by the response the server, the process 800 ends. Following the process 800, the environmental sensor unit may continue to collect data regarding environmental conditions, and at a later time may carry out the process 800 for transmitting the data to the server.

In some cases, it may be desirable to lessen power consumption by environmental sensor units. For example, environmental sensor units may have a limited source of power, such as a battery, and it may be desirable to make the lifespan of the limited source of power longer to reduce maintenance required on environmental sensor units, such as replacing a battery. In some embodiments, a power consumption by environmental sensor units may be reduced by having environmental sensor units enter a low-power sleep mode when not transmitting data. During the low-power sleep mode, power consumption by the environmental sensor unit may be reduced by limiting the functions that are executed during the low-power sleep mode. For example, environmental sensors may measure conditions of the environment during the low-power sleep mode, but the environmental sensor unit may not process data collected by the environmental sensors and/or transmit data collected by the environmental sensors during the low-power sleep mode.

To reduce power consumption, it may be desirable to increase the number of opportunities for the environmental sensor unit to enter the low-power sleep mode. In some embodiments, an opportunity for entering low-power sleep mode may arise when an environmental sensor unit has previously transmitted data regarding environmental conditions to a server via an associated device and is waiting for a response from the server, as discussed above in connection with block 806 of FIG. 8, and is not yet ready to transmit additional data regarding environmental conditions to the server. The environmental sensor unit may, in some cases, have to wait multiple seconds for the data to be communicated to the server, for the server to process the data and generate a response, and for the response to be communicated to the environmental sensor unit. During the multiple seconds the environmental sensor unit is waiting for the response, the environmental sensor unit is consuming power. Additionally, in some embodiments that implement the process 800 of FIG. 8A, an environmental sensor unit may not have other operations to carry out while waiting for a response from the server in block 806. This may be because the environmental sensor unit is configured to only periodically collect and transmit data regarding environmental conditions to the server, such as according to intervals specified by the server as discussed above in connection with block 810 of FIG. 8A. Waiting for a response from the server following a transmission of data and/or waiting for new data regarding environmental conditions to be produced for transmission to the server may therefore be an opportunity in some embodiments for placing the environmental sensor unit into a low-power mode to reduce power consumption.

Figure 8B:
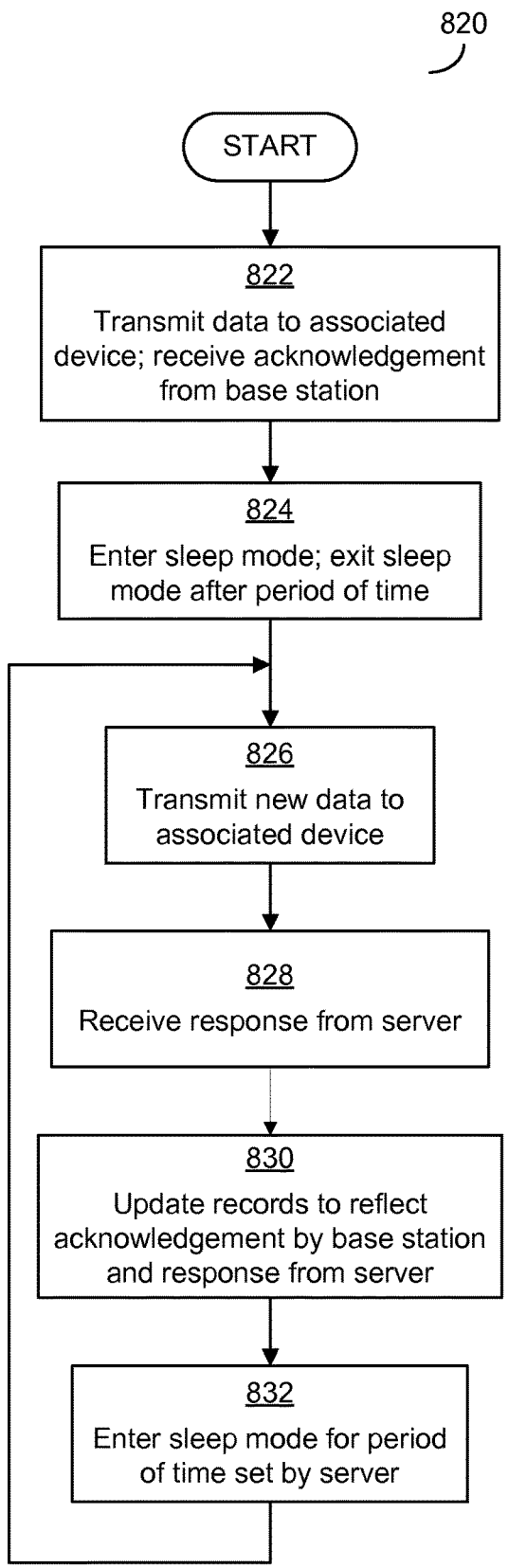
FIGS. 8B and 8C are flowcharts of exemplary processes for exchanging communications between an environmental sensor unit and a base station that may be implemented in embodiments in which environmental sensor units are configured to enter a low-power sleep mode.
Figure 8C:
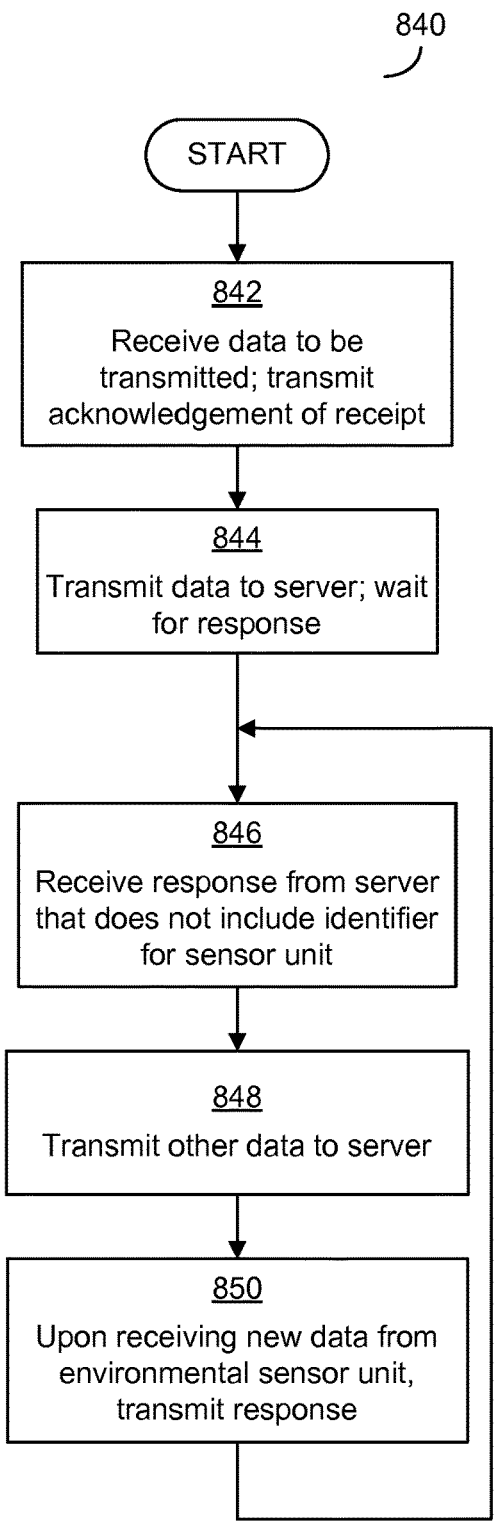

FIGS. 8B and 8C illustrate examples of processes that may be carried out by an environmental sensor unit and a base station, respectively, for communicating regarding data to be transmitted to a server by the base station and a subsequent response from the server to be communicated to an environmental sensor unit by the base station. In the examples of FIGS. 8B and 8C, the environmental sensor unit enters a low-power sleep mode after transmitting data to the base station for relaying to the server and before a response is received from the server. It should be appreciated, however, that embodiments in which an environmental sensor unit is adapted to enter a low-power sleep mode are not limited to implementing the exemplary processes of FIGS. 8B and 8C.

An environmental sensor unit may carry out the process 820 of FIG. 8B in parallel with a base station carrying out the process 840 of FIG. 8C. For ease of explanation, however, the process 820 of FIG. 8B will be described fully, after which the process 840 of FIG. 8C will be described.

Prior to the start of the process 820 of FIG. 8B, environmental sensors of an environmental sensor unit measure conditions of an environment and produce data regarding the conditions. The data may be processed by the environmental sensor unit as discussed above and prepared for transmission. Additionally, prior to the start of the process 820, the environmental sensor unit associates with another device in an environmental monitoring system, such that the environmental sensor unit is able to communicate data to a server of the environmental monitoring system via the associated device. The associated device may be a base station or may be another environmental sensor unit that has access to a base station.

The process 820 begins in block 822, in which the environmental sensor unit transmits a first set of data to the associated device after beginning to measure environmental conditions following start-up of the environmental sensor unit. The environmental sensor unit receives in block 822 an acknowledgement of the data from a base station that will relay the data to the server of the environmental monitoring system. The acknowledgement from the base station may be transmitted directly to the environmental sensor unit in the case that the base station is the associated device, or may be transmitted via one or more other environmental sensor units in the case that the associated device is an environmental sensor unit. The acknowledgement from the base station may be in any suitable format and include any suitable information identifying that the data was received and will be communicated to the server, as embodiments are not limited in this respect.

The data and the acknowledgement may be transmitted and received in block 822 in any suitable manner. For example, in some embodiments the transmissions of the data and the acknowledgement may be broadcast according to the stateless data communication protocol and may include in a payload of the request an identifier for a device for which the transmission is intended, as discussed above in connection with block 802 of FIG. 8A. For example, the transmission of the data may include in a payload of the transmission an identifier for the associated device. The acknowledgement may also be transmitted as a broadcast message according to the stateless data communication protocol and may include an identifier for the environmental sensor unit.

While not illustrated in FIG. 8B, in some embodiments if an acknowledgement is not received in block 822 or a negative acknowledgement (NACK) is received, the environmental sensor unit may retransmit the data. In some embodiments, the environmental sensor unit may also, as discussed above in connection with FIG. 6B, perform the association process again before retransmitting the data.

Once the environmental sensor unit receives an acknowledgement in block 822, in block 824 the environmental sensor unit enters sleep mode for a period of time. The period of time may be any suitable length of time. In some embodiments, the period of time during which the environmental sensor unit is in sleep mode may be a length of time that is a default interval between transmissions of data by the environmental sensor unit to the server. The default interval may be any suitable length of time. Following this period of time, the environmental sensor unit exits the sleep mode.

When the environmental sensor unit exits the sleep mode, in block 826 the environmental sensor unit again transmits data to the associated device for relay to the server. When the environmental sensor unit transmits the data in block 826, the base station transmits to the environmental sensor unit the response from the server that was received by the base station. This response from the server was received by the base station in response to relay by the base station of the data previously transmitted by the environmental sensor unit. The previously-transmitted data includes, in an initial case, the data transmitted by the environmental sensor unit in block 822. In block 822 discussed above, the base station transmitted to the environmental sensor unit an explicit acknowledgement of the data transmitted by the environmental sensor unit. In block 826, however, the response from the server is received in block 828 acts as an implicit acknowledgement that the data transmitted in block 826 was received by the base station and is being prepared by the base station for transmission to the server. When the environmental sensor unit receives, from the base station, the response from the server in block 828, in block 830 the environmental sensor unit updates records stored on the environmental sensor unit to indicate that the data transmitted in block 826 was acknowledged by the base station and to indicate that the previously-transmitted data (in the initial case, the data transmitted in block 822) was acknowledged by the server.

Following the updating of the records in block 830, the environmental sensor unit, in block 832, enters sleep mode for an amount of time set by the server. As discussed above in connection with block 810 of FIG. 8A, the server may specify in a response message a time at which the environmental sensor unit should next transmit data by specifying an interval that is a length of time. In block 832, the environmental sensor unit enters sleep mode for that period of time. When the environmental sensor unit exits sleep mode, the process 820 returns to block 826, in which the environmental sensor unit transmits new data. Once the environmental sensor unit transmits the data in block 826, in block 828 the environmental sensor units receives from the base station a response from the server to previously transmitted data (e.g., data previously transmitted in a prior iteration of block 826) that implicitly acknowledges the most recently transmitted data, and the environmental sensor unit updates records and enters sleep mode in blocks 830, 832. The loop of the process of FIG. 8B may continue as long as the environmental sensor unit has data to transmit and the server is providing responses to the data setting intervals, or may end upon satisfaction of any condition(s), as embodiments are not limited in this respect. In each iteration of the loop, the base station transmits to the environmental sensor unit the response received by the base station to the previous transmission of the data and thereby implicitly acknowledges a recent transmission of data. Between each transmission, the environmental sensor unit enters sleep mode.

The process 840 of FIG. 8C may be carried out by a base station to relay data for an environmental sensor unit in some embodiments in which the environmental sensor unit is adapted to enter a sleep mode. For ease of explanation of the process 820 of FIG. 8B, the operations of the base station in process 840 are described here together with the process 820. However, detailed operations of the base station are not discussed here in connection with FIG. 8C. Further details regarding ways in which the base station may receive and relay communications between environmental sensor units and a server are provided below in connection with FIG. 10.

The process 840 begins in block 842, in which the base station receives data to be transmitted to a server, where the data relates to environmental conditions measured by environmental sensors of an environmental sensor unit. The data may be received by the base station directly from the environmental sensor unit that made the measurements or may be relayed to the base station by one or more other environmental sensor units.

When the base station receives the data in block 842, the base station also transmits to the environmental sensor unit that originally transmitted the data an acknowledgement of receipt of the data. The acknowledgement may be transmitted in the same manner as the data was received in block 842, including directly to the environmental sensor unit that produced the data or indirectly via one or more other environmental sensor units. In some embodiments, the base station may acknowledge data in block 842 without reviewing the data to determine whether the data was properly received by the base station. In other embodiments, however, the base station may perform a cyclic redundancy check (CRC) or other error detection process on the data based on error detection information included with the data and determine whether the data was correctly received or whether the data includes errors. If the data does not include errors, the base station may acknowledge receipt. If data errors are detected, however, the base station may not acknowledge receipt or may transmit a negative acknowledgement (NACK) indicating that the data was received with errors.

The data and the acknowledgement may be transmitted and received in block 842 in any suitable manner, including as discussed above in connection with block 822 of FIG. 8B. For example, in some embodiments the transmissions of the data and the acknowledgement may be broadcast according to the stateless data communication protocol and may include in a payload of the request an identifier for a device for which the transmission is intended. For example, the transmission of the data may include in a payload of the transmission an identifier for the base station. The acknowledgement may also be transmitted as a broadcast message according to the stateless data communication protocol and may include an identifier for the environmental sensor unit.

In block 844, once the data is received and acknowledged, the base station relays the data to the server. In some cases, the base station may have multiple pieces of data to transmit to the server, such as multiple pieces of data received from multiple environmental sensor units that have associated with the base station. In some embodiments, the base station may transmit data as the base station receives the data. In the embodiment of FIG. 8C, however, the base station may transmit one piece of data at a time and may wait for a response from the server to that data before transmitting another piece of data. This may be done for reasons related to power consumption. If the base station transmits multiple different pieces of data without waiting for responses, multiple responses from the server may be outstanding at any given time. In embodiments in which the base station transmits multiple pieces of data without waiting for responses, responses from the server may need to include an identification of the data to which the response relates, which may be an identification of the environmental sensor unit that originally produced the data. Such an identification may be a unique identifier for the environmental sensor unit. A unique identifier may be lengthy when represented in binary for inclusion in a response from the server. When the server includes such lengthy binary representations in each response, wireless communications including the lengthy binary representation require more energy to produce, transmit, receive, and process, which can increase power consumption in an environmental monitoring system. If the base station transmits one piece of data at a time and waits for a response to that data before transmitting more data, however, the base station would be aware of the data to which a response relates (i.e., the data most recently transmitted) and would be aware of the environmental sensor unit that produced that data. A response message may therefore not include an identification of the environmental sensor unit, which can shorten the response and lessen power consumption related to the message.

Accordingly, in block 844, the base station transmits the data received in block 842 and waits before transmitting other data to the server. In block 846, the base station receives a response from the server that does not include an identifier for the environmental sensor unit that produced the data received in block 842 and transmitted in block 844. The base station may then store the response and, in block 848, transmit other data to the server that has been received by the base station and is ready for transmission to the server.

In block 850, the base station receives from an environmental sensor unit a next set of data to be transmitted to the server. The transmission may be received from the environmental sensor unit when the environmental sensor unit exits low-power sleep mode, as discussed above in connection with FIG. 8B. The transmission of data from the environmental sensor unit may be received directly from the environmental sensor unit or may be received via one or more other environmental sensor units, as with the data received in block 842. When the base station receives the data, the base station identifies the environmental sensor unit making the transmission and retrieves from storage the response from the server received for data previously transmitted to the server by the base station on behalf of that environmental sensor unit. Once the base station has retrieved the response from the server that corresponds to the environmental sensor unit from which data is received in block 850, the base station transmits the response to the environmental sensor unit as an implicit acknowledgement of the data received in block 850. Once the response is transmitted to the environmental sensor unit, the base station returns to block 846 to receive a response from the server to data transmitted in block 848, transmit other data in block 848, and receive new data and transmit previously-received responses in block 850. The process 840 may be performed by the base station so long as data is received from environmental sensor units and is to be transmitted to the server, or may end upon satisfaction of any condition(s), as embodiments are not limited in this respect.

Figure 10:
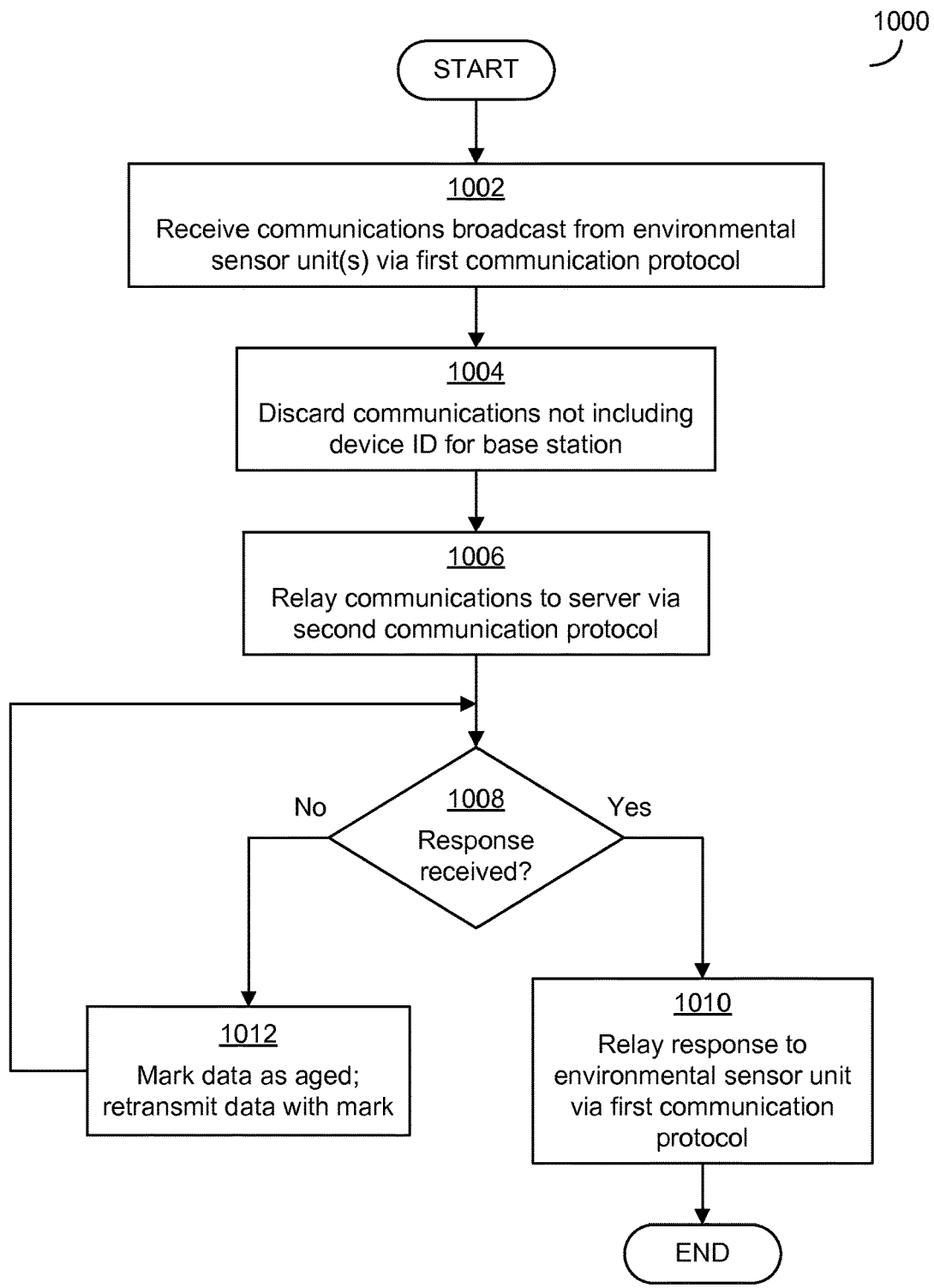
FIG. 10 is a flowchart of an exemplary process for transmitting and receiving data by a base station.

In some cases, as discussed in detail below in connection with FIG. 10, to transmit data to the server, the base station may transmit the data multiple times before receiving a response from the server. This may be due, for example, to poor communication quality in the wireless network over which the base station transmits the data. When the base station transmits the data multiple times, it is possible that when the environmental sensor unit requests the response from the server, the base station may not yet have received the response from the server. In some embodiments, when the response from the server has not yet been received by the base station, the base station may transmit to the environmental sensor unit an indication that the response has not been received and that the environmental sensor unit should request the response again at a later time. In other embodiments, however, the base station may not respond to the request from the environment sensor unit until the response from the server is available.

In some embodiments in which environmental sensor units are adapted to enter a low-power sleep mode, environmental sensor units may also be adapted to form a mesh network to relay communications between one another and to a base station. Such a mesh network may be formed when an environmental sensor unit associates with another environmental sensor unit to relay data to a server, as discussed above in connection with FIG. 6A. When environmental sensor units are operating in a low-power sleep mode, the environmental sensor units may not be able to transmit wireless communications. Accordingly, when environmental sensor units relay communications for other environmental sensor units, for communications to be transmitted successfully in a mesh network the environmental sensor units acting as relays may all need to be operating in a normal mode or otherwise not in the low-power sleep mode.

In some embodiments, therefore, the environmental sensor units may be adapted to exit the low-power sleep mode when communications are to be relayed between the environmental sensor units in a mesh network. The environmental sensor units may be adapted to detect that communications are to be relayed and exit the low-power sleep mode in any suitable manner, as embodiments are not limited in this respect.

In some embodiments, for example, the environmental sensor units may each be adapted to exit the low-power sleep mode periodically such that communications can be exchanged. In some embodiments in which the environmental sensor units exit the sleep mode periodically, the environmental sensor units may, upon forming a mesh network, produce a synchronized clock signal using any suitable synchronization technique. The synchronized clock signal may then be used by the environmental sensor units to determine when a predefined period of time (e.g., one minute, five minutes, etc.) has elapsed. When the predefined period of time has elapsed, each of the environmental sensor units may exit the low-power sleep mode synchronously and begin relaying communications.

In other embodiments, the environmental sensor units may be adapted to exit the low-power sleep mode upon detecting transmissions that use the low-power wireless communication protocol with which the environmental sensor units communicate. When an environmental sensor unit detects that other sensor units are communicating using the low-power wireless communication protocol, the environmental sensor unit may conclude that communications may need to be received and relayed and may therefore exit the low-power sleep mode.

Figure 8D:
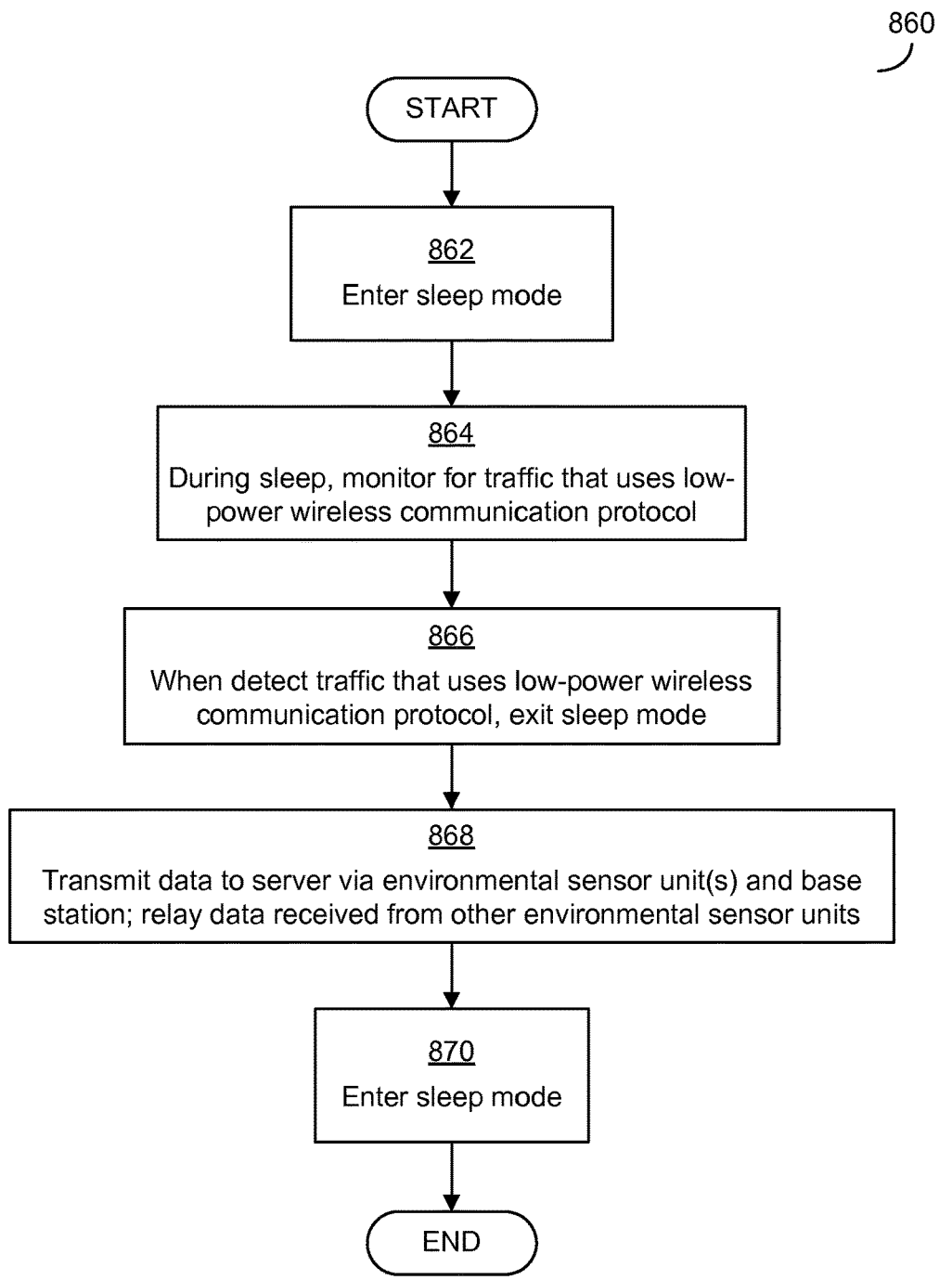
FIG. 8D is a flowchart of an exemplary process for exchanging communications between environmental sensor units that may be implemented in embodiments in which environmental sensor units are configured to enter a low-power sleep mode.

FIG. 8D illustrates an exemplary process 860 that an environmental sensor unit may use to exit sleep mode upon detection of communications. The process 860 begins in block 862, in which the environmental sensor unit enters the low-power sleep mode. While in sleep mode, the environmental sensor unit may carry out some operations. In particular, in block 864, the environmental sensor unit monitors, with a wireless transceiver configured to operate according to the low-power wireless communication protocol, for traffic that uses that protocol. The environmental sensor unit may monitor for traffic in any suitable manner, including by monitoring for signal strengths in one or more frequency bands that are above a threshold signal strength.

In block 866, when the environmental sensor unit detects traffic that uses the low-power wireless communication protocol, the environmental sensor unit exits the sleep mode. Once the environmental sensor unit exits the sleep mode, in block 868 the environmental sensor unit may transmit to the server, via other environmental sensor units and/or a base station, data collected by environmental sensors of the unit and processed by the unit. In block 868, the environmental sensor unit may also receive communications from other environmental sensor units that are directed to the environmental sensor unit and that are to be relayed for eventual transmission by a base station. When the environmental sensor unit receives such communications, in block 868 the environmental sensor unit relays the communications to another device of the environmental monitoring system with which the environmental sensor unit is associated (e.g., a base station or another environmental sensor unit).

After transmitting/relaying data in block 868 and performing any other suitable operations, the environmental sensor unit enters sleep mode again in block 870 and the process 860 ends.

As discussed above, a response from the server may include an acknowledgement of data received by the server as well as an instruction of a time at which a next piece of data should be transmitted by an environmental sensor unit. In some embodiments, in addition to identifying a next time at which the environmental sensor unit should transmit data to the server, a response from a server to a transmission from environmental sensor unit may provide other information or commands. For example, in some cases, a response may instruct an environmental sensor unit to update instructions stored on the environmental sensor unit (e.g., firmware of the environmental sensor unit, or any other type of software stored on the environmental sensor unit). The server may transmit to be environmental sensor unit instruction to update the instructions in response to an automatic determination made by the server that the environmental sensor unit is executing an updated version of the instructions. For example, when an environmental sensor unit transmits information regarding the environmental sensor unit and/or data to the server, the environmental sensor unit may include in the message an indication of the version of the instructions that is stored on the environmental sensor unit. When the server receives this information, if the server determines that a later version of the instructions is available, the server may transmit to the environmental sensor unit instruction to update the instructions. By doing so, the environmental monitoring system may maintain itself and update itself automatically, which lessens a maintenance burden associated with the environmental monitoring system. In particular, an operator of an environment in which the environmental monitoring system is located may not be required to take any action for the instructions to be updated.

Figure 9A:
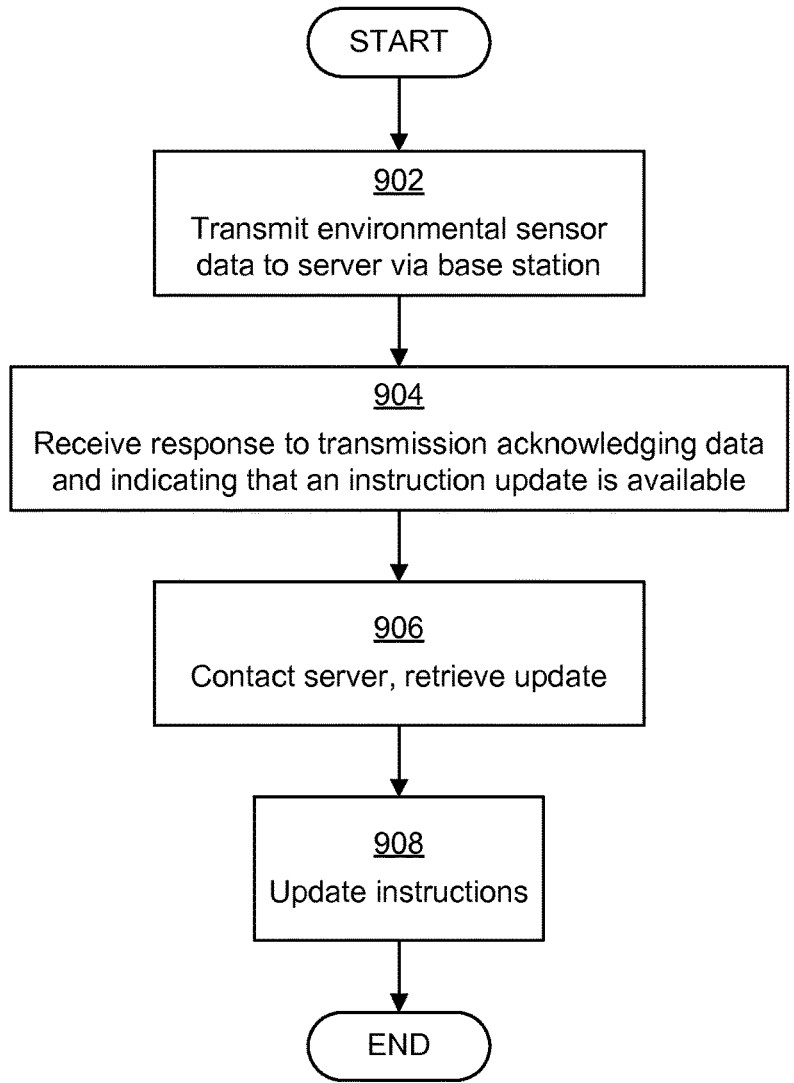
FIG. 9A is a flowchart of an exemplary process for updating instructions of an environmental sensor unit.

FIG. 9A illustrates an example of a process that may be carried out in some embodiments for an environmental sensor unit to update instructions stored on the environmental sensor unit in response to an instruction received from the server. Prior to the start of the process 900 of FIG. 9A, an environmental sensor unit and the base station are deployed in an environment, the environmental sensor unit associates with the base station, and the environmental sensor unit collects data regarding one or more environmental conditions of the environment.

The process 900 begins in block 902, in which the environmental sensor unit transmits data regarding one or more environmental conditions to a base station for relay to the server. In block 904, the environmental sensor unit receives from the base station a response to that transmission, in which the server acknowledges receiving the data from the environmental sensor unit and identifies that an update is available for the instructions stored on the environmental sensor unit.

In response to receiving the instruction from the server, the environmental sensor unit contacts an update server in block 906, which may be the same server as the server to which the data was transmitted block 902 or may be a different server, as embodiments are not limited in this respect. In block 906, the environmental sensor unit retrieves the update by requesting that the base station retrieve the update and relay the update to the environmental sensor unit. Once the update is relayed to the environmental sensor unit by the base station, in block 908 the environmental sensor unit updates the instructions stored on the environmental sensor unit according to the update. The updating of block 908 may be carried out in any suitable manner, including using techniques known in the art for updating firmware or other forms of software installed on a device, as embodiments are not limited in this respect. In some embodiments, communications regarding environmental conditions may be exchanged between components of an environmental monitoring system using a stateless protocol, such as UDP. In some such embodiments, however, a request for an update and subsequent communications regarding the update may be exchanged using a stateful protocol, such as the Transmission Control Protocol (TCP). It should be appreciated, however, that embodiments are not limited to exchanging communications regarding an update using any particular protocol or type of protocol.

Once the instructions on the environmental sensor unit have been updated, the process 900 ends. As a result of the process 900, instructions stored on the environmental sensor unit have been changed or replaced with new instructions. Following the process 900, the environmental sensor unit may execute the changed/new instructions stored in storage of the environmental sensor unit and carry out various operations specified by the instructions.

As discussed above in connection with FIGS. 8B-8D, in some embodiments an environmental sensor unit may be adapted to enter a low-power sleep mode to reduce power consumption by the environmental sensor unit. The environmental sensor unit may enter the low-power sleep mode when the environmental sensor unit is waiting for communications to be received and relayed by a base station, such as responses from a server as discussed above in connection with FIG. 8B. In some embodiments, an environmental sensor unit may also be configured to enter a low-power sleep mode while waiting for a base station to receive an instruction update, rather than waiting for the instruction update to be relayed by the base station as discussed in connection with block 906 of FIG. 9A.

Figure 9B:
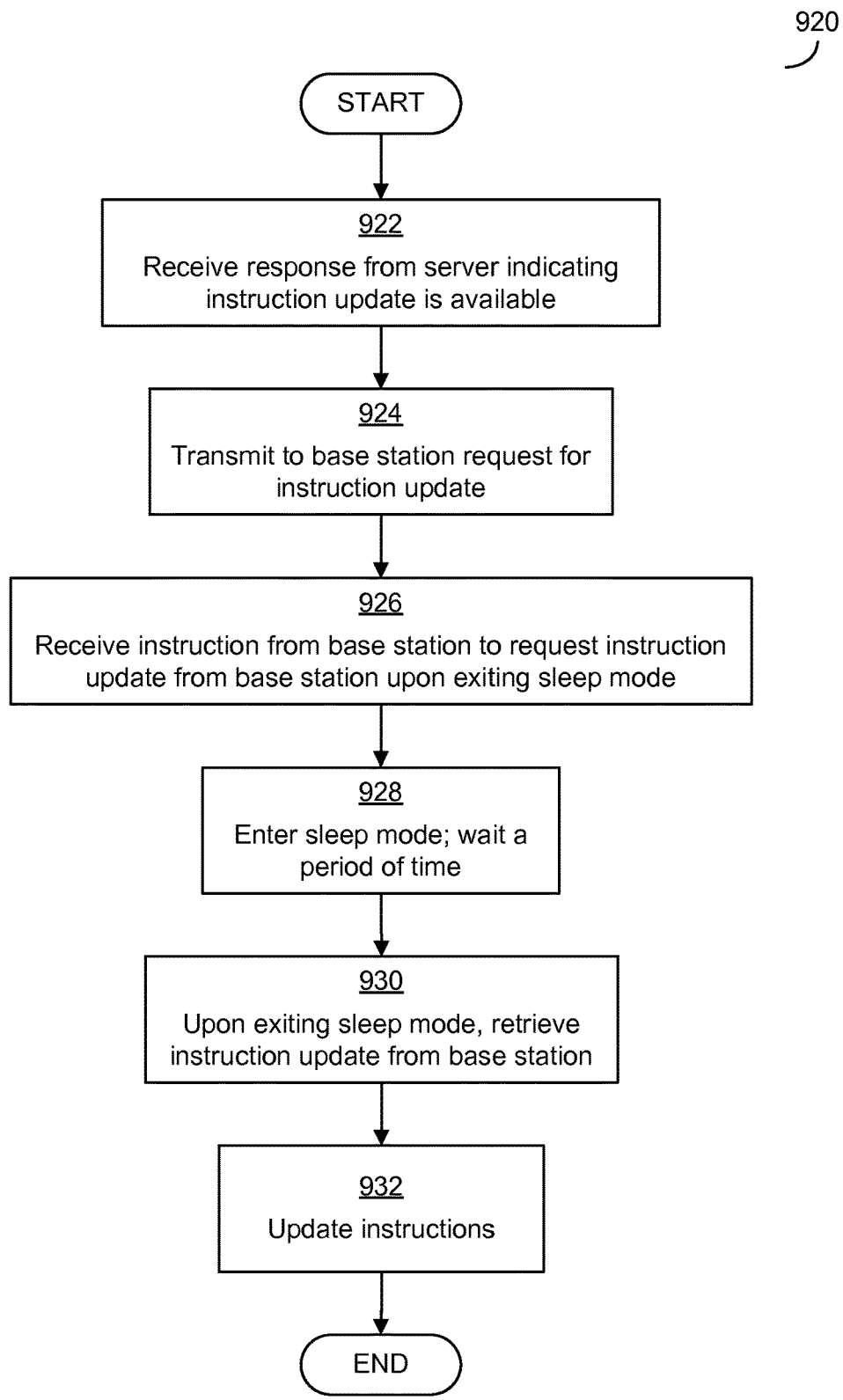
FIG. 9B is a flowchart of an exemplary process for updating instructions of an environmental sensor unit that may be implemented in embodiments in which environmental sensor units are configured to enter a low-power sleep mode.

FIG. 9B illustrates an example of a process by which an environmental sensor unit may enter a low-power sleep mode while waiting for a base station to retrieve an instruction update. Prior to the start of the process 920 of FIG. 9B, an environmental sensor transmits data to a server via a base station. The base station receives a response to the transmission of data and relays that response to the environmental sensor unit. The process 920 begins in block 922, in which the environmental sensor unit receives the relayed response from the base station. The response from the server may acknowledge receipt of the data and may indicate a future time at which the environmental sensor unit is to transmit data. The response received in block 922 also indicates than an instruction update is available.

In block 924, the environmental sensor unit transmits to the base station (directly or indirectly via one or more other environmental sensor units) a request for the instruction update. In response to the request of block 924, the environmental sensor unit receives in block 926 an instruction from the base station to request the instruction update from the base station again following exit from sleep mode. After the base station transmits the instruction received in block 926, the base station may retrieve the instruction update and store the instruction update in storage of the base station for subsequent transmission to the environmental sensor unit.

After the environmental sensor unit receives the instruction from the base station in block 926, the environmental sensor unit may enter a low-power sleep mode for a period of time. The period of time may be any suitable period of time. In some embodiments, the period of time may be a predefined, fixed period of time (e.g., thirty seconds, one minute, five minutes, etc.). In other embodiments, the period of time may be any suitable period of time, including a period of time defined by the base station and a period of time that is not fixed and ends upon satisfaction of a condition, such as the periods of time discussed above in connection with FIG. 8B.

Once the period of time passes and the environmental sensor unit exits sleep mode, the environmental sensor unit in block 930 requests that the base station transmit the instruction update to the environmental sensor unit. The environmental sensor unit may then in block 932, upon receiving the instruction update, update the instructions stored on the environmental sensor unit as discussed above in connection with FIG. 9A.

Once the instructions have been updated in block 932, the process 900 ends. As a result of the process 920, as with the process 900, instructions stored on the environmental sensor unit have been changed or replaced with new instructions. Following the process 920, the environmental sensor unit may execute the changed/new instructions stored in storage of the environmental sensor unit and carry out various operations specified by the instructions.

Various processes that can be carried out by environmental sensor units, according to techniques described herein are described above in connection with FIGS. 5-9B. Among those processes are processes for communicating data to a server via a base station or environmental sensor unit with which the environmental sensor unit is associated. It should be appreciated that a base station or environmental sensor unit may take any suitable action to relay communication received from a base station to a server, as embodiments are not limited in this respect. FIG. 10 illustrates an example of a process that may be carried out by base stations or environmental sensor unit in some embodiments for relaying communications between environmental sensor units and servers.

The process 1000 begins in block 1002, in which a low-power wireless transceiver of the base station receives communications from multiple different environmental sensor units located in the environment within range of the base station. These communications may be received from the environmental sensor units by the low-power wireless transceiver according to the low-power wireless communication protocol. As discussed above in connection with FIG. 8A, the environmental sensor units may broadcast messages from the environmental sensor units and include in payloads of the messages identifiers for devices with which each of the environmental sensor units has elected to associate. Accordingly, some of the communications received by the base station from the environmental sensor units in block 1002 may be communications that are not intended for the base station and that should not be relayed to the server by the base station. Therefore, in block 1004, the base station discards all communications received in block 1002 that do not include an identifier for the base station.

Once the base station has discarded all communications that do not include an identifier for the base station, the base station may be left with communications from one or more environmental sensor units that have elected to associate with the base station and for which the base station should relay communications to the server. Accordingly, in block 1006 the base station transmits each such communication received from an environmental sensor unit to the server. Relaying the communications to the server in block 1006 may include creating a communication according to a higher-power wireless communication protocol then the low-power wireless communication protocol, such as a cellular network protocol, or a WLAN protocol. The communication that is created in block 1006 may be created based on the communication received by the low-power wireless transceiver from the environmental sensor unit. For example, in some embodiments, a communication received from an environmental sensor unit may include a message formatted according to a data communication protocol that is encapsulated within a message formatted according to the low-power wireless communication protocol. To create a communications according to the higher-power wireless communication protocol, the base station may extract, from the communication received from the environmental sensor unit, the message formatted according to the data communication protocol. The base station may then insert the message formatted according to the data communication protocol into the new communication formatted according to the higher-power wireless communication protocol. The communication formatted according to the higher-power wireless communication protocol may therefore include the communication that is formatted according to the data communication protocol, as well as header information or other information for the higher-power wireless communication protocol.

Once a communication formatted according to the higher-power wireless communication protocol is created, the communication is transmitted to the server by the higher-power wireless transceiver of the base station.

After a communication from an environmental sensor unit is relayed by the base station, the base station may monitor for a response to that communication from the server transmitted using the higher-power wireless communication protocol. In block 1008, the environmental sensor unit may determine whether a response is received.

If a response is received, then the base station, in block 1010, relays the response from the server to the environmental sensor unit from which the communication was originally received. Relaying the response from the server to the environmental sensor unit may be carried out using a process similar to the process for relaying communications to the server described above in connection with block 1006. For example, a response from the server may be formatted according to the higher-power wireless communication protocol, but may include a message formatted according to the data communication protocol. The base station may extract the message formatted according to the data communication protocol, and insert that message into a new communication formatted according to the low-power wireless communication protocol. The new communication formatted according to the low-power wireless communication protocol may then be transmitted to the environmental sensor unit using the low-power wireless transceiver of the base station.

If, however, the base station determines in block 1008 that a response has not been received from the server, the base station may retransmit the communication to the server. However, prior to retransmitting the communication to be server, the base station may mark the communication as including old data. The base station may mark the communication as including old data because the communication from the environmental sensor unit that is being relayed to the server includes information regarding environmental conditions of the environment.

The server may be using the data regarding the environmental conditions of the environment to determine whether any conditions in the environment are outside acceptable operating ranges for the conditions and whether an alert should be raised. The communication that was transmitted in block 1006 and for which the response was not received may include data regarding conditions of the environment, but because the data was previously transmitted and time passed while the base station waited for a response, the data may no longer be timely. If the data is retransmitted and is received by the server, the server might determine that the data indicates that an alert should be raised. However, because the data is not timely, it is possible that the environmental condition indicated by the data is no longer outside of the acceptable operating range and therefore the alarm would be a false alarm.

Additionally or alternatively, the environmental sensor unit from which the data was originally received may be collecting additional data regarding the environmental conditions and may be transmitting that data to the base station for relaying to the server. The server may be configured to generate alerts based only on the most recent data received from the environmental sensor units. If data is aged and no longer reflects the most recent data generated by the environmental sensor units, marking the data as aged may aid the server is generating alerts based only on the most recent data generated by the environmental sensor units. The server may then not generate alarms based on the aged data and will instead consider data generated recently by the environmental sensor units. Additionally, in such embodiments in which the server may only consider the most recently-received data to determine whether to generate alerts, there may be value in transmitting the data to the server, such that the server is able to store all of the data collected over time. For example, the server and/or a user may analyze previously-received data to identify trends in the data and identify how environmental conditions change over time.

Additionally or alternatively, in some embodiments the server may process multiple pieces of data to determine whether to trigger an alert, such as by analyzing the most recent 10 pieces of data received from an environmental sensor unit. In some such embodiments, the server may apply different weights to data depending on when the data was collected data, or otherwise analyze data differently based on the age of the data. In such embodiments, by marking data retransmitted by the base station with the age or the data or by marking the data as aged, the server may be able to determine how to analyze data received from a base station.

Thus, in block 1012 the base station marks the data of the communication as aged and retransmits the communication for which a response was not received. To mark the data as aged, the base station may simply flag the data as old data, or the base station may include in the message an indication of a time at which the data was originally received by the base station from an environmental sensor unit.

The base station may continue to monitor for a response, relay responses, and mark data as aged for each communication received from an environmental sensor unit and relayed to the server. For each communication, the process 1000 ends once a response to the communication is relayed to the environmental sensor unit in block 1010. In some embodiments, the base station may continue to retransmit communications in this way for a maximum period of time, maximum number of retransmissions, or any other suitable threshold. In such embodiments, the process 1000 may end for a communication once the threshold is met.

The process 1000 for relaying communications is described above as being carried out by a base station, and includes operations including transferring communications between a low-power and higher-power wireless communication protocols. However, it should be appreciated that, in some embodiments, components of an environmental monitoring system other than base stations may relay communications for an environmental sensor unit. For example, other environmental sensor units may relay communications for an environmental sensor unit. To relay communications, an environmental sensor unit may carry out a process similar to the process 1000, including acts of analyzing received communications, discarding communications, relaying communications, and retransmitting communications with data marked aged. As should be appreciated from the foregoing discussion of environmental sensor units, however, to relay communications an environmental sensor unit may not communicate using the higher-power wireless communication protocol. Rather, an environmental sensor unit that is acting as a relay may receive communications using the low-power wireless communication protocol and transmit communications using the low-power wireless communication protocol. When an environmental sensor unit relays communications intended for the server, the environmental sensor unit may transmit the communications to another component of the environmental monitoring system with which the environmental sensor unit is associated, which may be a base station (which would in turn perform the process 1000 of FIG. 10) or another environmental sensor unit. When an environmental sensor unit relays communications received from the server, the environmental sensor unit may transmit the communications to the environmental sensor unit from which data regarding environmental conditions was previously received.

Figure 11:
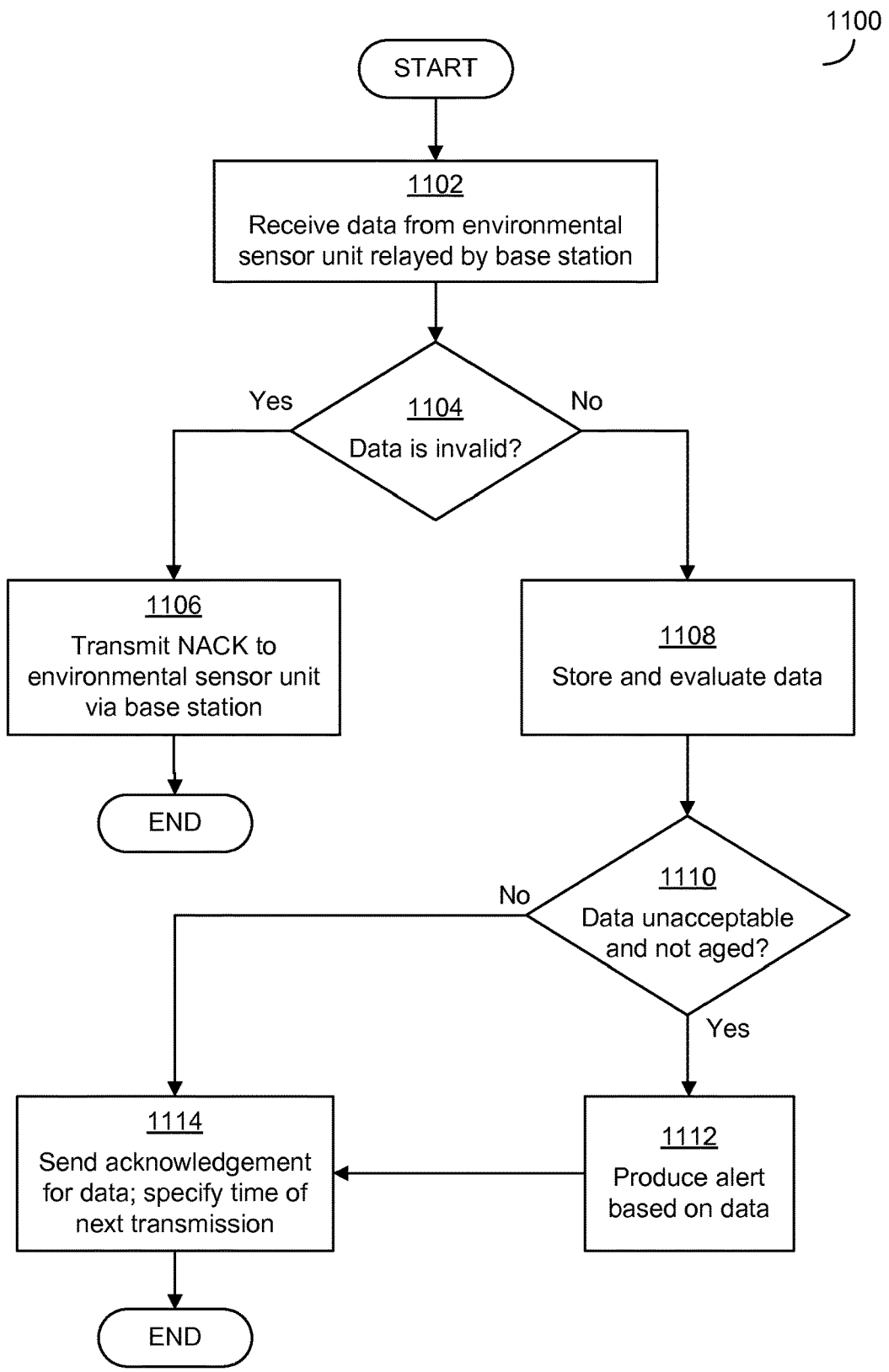
FIG. 11 is a flowchart of an exemplary process for operating a server to process data received from an environmental sensor unit.

A server of the environmental monitoring system may take any suitable action upon receiving data regarding an environmental condition that is relayed by a base station from the environmental sensor unit to the server. Embodiments are not limited to forming any particular process on the server when data is received from an environmental sensor unit. FIG. 11 illustrates one process that may be carried out in some embodiments for processing a communication received from a base station, including data transmitted by the environmental sensor unit regarding conditions of an environment.

The process 1100 of FIG. 11 begins in block 1102, in which the server receives data from an environmental sensor unit relayed by a base station. The data received from the environmental sensor unit in block 1102 may include data regarding one or more environmental conditions measured by the environmental sensor unit. Upon receiving the data in block 1102, the server may determine in block 1104 whether the data is valid. The server may determine when the data is valid in any suitable manner, such as by evaluating the data using an error detection process. For example, a communication transmitted from the environmental sensor unit to the server, via the base station, may include a cyclic redundancy check (CRC) field by which the server may be able to determine whether the data includes any bit errors. If the server determines in block 1104 that the data is invalid, in block 1106 the server may transmit a response to the environmental sensor unit, via the base station, that includes a negative acknowledgment (NACK) of the data. As discussed above, when the environmental sensor unit receives such a negative acknowledgment from the server, the environmental sensor unit may retransmit the data from the environmental sensor unit, via the base station, to the server. Once the server is transmitted the negative acknowledgment in block 1106, the process 1100 ends.

If, however, the server determines in block 1104 that the data is valid, then in block 1108 the server stores the data in a data store and evaluates the data in any suitable manner. For example, the server may evaluate the data in block 1108 to determine whether the data is not marked as aged and whether the data indicates that an environmental condition is outside of an acceptable operating range or otherwise meets conditions for the triggering of an alert. If the server determines in block 1110, based on the evaluation of block 1108, that the data indicates that an environmental condition is unacceptable and the data is not aged, then in block 1112 the server may produce an alert based on the data. The server may produce an alert in any suitable manner, such as by producing an audible and/or visual alert displayed via a user interface, or by transmitting a text message, such as an SMS message or an e-mail message, to the operator or administrator of the environmental monitoring system.

After the server has produced an alert based on the data, or when the server determines in block 1110 that the data is acceptable or is aged, the server in block 1114 sends an acknowledgment for the data to the environmental sensor unit from which the data was received. In addition to sending the acknowledgment, the server may instruct the environmental sensor unit of a next time at which the environmental sensor unit may transmit data. The server may select a time at which the environmental sensor unit is to next transmit data in any suitable manner, as embodiments are not limited in this respect. For example, the server may evaluate the data regarding the environmental conditions in select a time based on the status of the environmental conditions as indicated by the data. The server may select a time based on the data such that, when the data indicates that an environmental condition is nearly outside of acceptable operating ranges, the environmental sensor unit transmits data regarding the environmental conditions more frequently. When the environmental sensor unit transmits data more frequently, the server may be able to determine sooner whether an environmental condition has strayed outside of an acceptable operating range. On the other hand, the server may select a time based on data such that, when the data indicates that an environmental condition is not nearly outside of an acceptable operating range, the environmental monitoring system transmits data regarding the environmental conditions less frequently.

It should be appreciated that the server may send and receive communications that are formatted in any suitable manner. As discussed above, the base station may transmit communications to the server using a higher-power wireless communication protocol then the low-power wireless communication protocol. However, it should be appreciated that the server may not receive communications formatted according to this higher-power communication protocol. In some embodiments, for example, the communications formatted according to the higher-power wireless communication protocol may be received by an access point of a wireless network operating according to the higher-power wireless communication protocol (e.g., a cell tower or a WLAN access point) and may be reformatted for transmission across the Internet according to another communication protocol. Communications received by the server and sent by the server in such embodiments may be formatted according to this other communication protocol, but may be communicated between the access point and the base station according to the higher-power wireless communication protocol. In other embodiments, however, the server may receive communications from the base station and may transmit communications to the base station using the higher-power wireless communication protocol.

Once the server transmits the acknowledgement and the specification of the next time in block 1114, the process 1100 ends. Following the process 1100 of FIG. 11, the server stores data regarding an environmental condition measured by environmental sensor unit. In addition, in cases where the server produced an alert based on the data, the alert has been triggered and presented to a user, and a user may take action to correct an environmental condition, such as by diagnosing a cause of the environmental condition being outside acceptable operating range and fixing that cause.

Communications that are exchanged between components of the environmental monitoring system may be exchanged using the low-power and higher-power wireless communication protocols and may be formatted according to the higher-power low-power wireless communication protocols. In addition, a payload of a communication formatted according to the higher-power or low-power wireless communication protocol may be formatted according to a data communication protocol. In some embodiments, a sensor unit, a base station, and a server may exchange messages formatted according to a stateless data communication protocol. Such a stateless data communication protocol may be a protocol that does not establish a connection between the source and a destination of a message that is to be transmitted between components of an environmental monitoring system. An example of a stateless data communication protocol is the User Datagram Protocol (UDP). By using a stateless data communication protocol to exchange data in the environmental monitoring system, energy may be conserved in the environmental monitoring system. Other forms of data communication protocol, including stateful data communication protocols, exchange multiple control messages between a source and a destination to establish a connection between the source and destination and to ensure reliability of messages transmitted between the source and destination. Each such control message uses energy in processing messages to be sent and communications received and in transmitting the messages, which increases energy consumption of the environmental monitoring system. When energy consumption increases, costs associated with an environmental monitoring system increase. In addition, for devices that are battery-powered, maintenance associated with the environmental monitoring system may be increased, as batteries need to be replaced more frequently when energy consumption is higher. Accordingly, transmitting messages according to a stateless data communication protocol may have advantages in reducing costs and maintenance associated with an environmental monitoring system. Additional details regarding an illustrative data communication protocol that may be used in some embodiments are available in the '485 patent and the '971 application.

Accordingly, in some embodiments, communications may be transmitted between environmental sensor units, base stations, and servers using a stateless data communication protocol. FIGS. 12 and 13 illustrate examples of message formats that may be used in some embodiments for transmitting some communications between components of an environmental monitoring system according to a data communication protocol. FIG. 12 illustrates a message format 1200 that may be used by an environmental sensor unit or a base station to transmit data from the environmental sensor unit to a server via a base station. FIG. 13 illustrates a message format 1300 that may be used by a server for transmitting a response to an environmental sensor unit to a communication received from the environmental sensor unit.

The message format 1200 of FIG. 12 for transmissions from a base station or environmental sensor unit includes multiple fields, each of which includes one or more bytes of binary data. The message format 1200 includes one leading bit that is a zero. Following the leading bit is a byte that identifies a number of messages included in the communication. The number of messages identifies a number of pieces of data included in a communication formatted according to the message format 1200. Each of the pieces of data included in a communication may identify a state of the environmental sensor unit or base station transmitting the message, or may relate to an environmental condition measured by the environmental sensor unit or base station. Data that identifies a state of the device may identify properties of the device such as a version of the hardware of the device and/or instructions stored by the device, a battery level of the device or an indication that the device is using AC power, or an identification of a version of the data communication protocol used by the device. The message format 1200 additionally includes a 10 byte field that includes a device identifier for a device that is transmitting a communication according to the message format 1200. Following the device identifier field and the message format 1200 is a sequence of one or more pairs of fields. Each of the pairs of fields includes one byte field containing a message identifier and a field of variable length containing content of a message. Each of the pairs of message fields relate to a piece of data that is included in the communication. Each piece of data that might be included in a communication formatted according to message format 1200 is associated with a message ID that is a hexadecimal identification of the piece of data and is associated with a format that the data is to take when included in a communication. The format that the data is to take may be based on the type of the data and maybe of variable length. For example, for data related to a wind speed detected by an environmental sensor, a message ID that is a hexadecimal value 0x6A may be included in a pair of message fields, and message content may be formatted as two bytes of binary data are presenting an integer between 0 and 10,000, where the integer identifies a wind speed between 0 and 100 mph. As another example, for data related to a flood sensor identifying whether an environment is flooded, a message ID that is a hexadecimal value 0x6B may be included in a pair of message fields, and message content may be formatted as a single byte taking one of two values: a zero indicates no flood and a hexadecimal value of 0x20 indicates the presence of a flood in the environment. As a further example, for data related to a voltage detected by the environmental sensor, a message ID that is a hexadecimal value of 0x6C may be included in a pair of message fields, and message content may be formatted as multiple bytes, dependent on the number of voltage sensors. A first byte of the message content may identify a number of voltage sensors included in an environmental sensor unit and for which data is being communicated. The next bytes of the message content may include four bytes for each voltage sensor, where the four bytes include one byte identifying a microprocessor pin or port of the environmental sensor unit to which the voltage sensor is connected and three bytes containing a binary representation of an integer between −1,000,000 and 1,000,000, representing a voltage between −1000 V and 1000 V. Data regarding the status of a device or environmental conditions may be represented in any suitable format and may be stored in the pair of message fields of the message format 1200 in any suitable manner. Following the sequence of one or more pairs of message fields (two pairs are shown in the example of FIG. 12), the message format 1200 includes a last byte which is a cyclic redundancy check (CRC) field that includes a binary value identifying an expected result of a CRC process performed on the binary data preceding the CRC field.

The message format 1300 of FIG. 13 for transmissions from a server is similar to the message format 1200 of FIG. 12, except that the message format 1300 does not include the device ID field of message format 1200. The message format 1300 also includes a leading bit that is a zero, a one byte field that identifies the number of messages included in the communication, a sequence of one or more pairs of message fields, and a last byte that identifies an expected value of a CRC process performed on the binary data preceding the CRC field. The messages that may be transmitted from the server using the message format 1300 may be any suitable administrative messages. For example, a message that may be included in a pair of message fields of the message format 1300 may be an instruction to an environmental sensor unit of a next time at which the environmental sensor unit should transmit data. As another example, a message that may be included in a pair of message fields of the message format

1300 may be an actuator command that instructs the environmental sensor unit to open an actuator of the environmental sensor unit, so as to turn on an actuator to operate some component of the environmental sensor unit. As discussed above, a component that may be turned on by the actuator may be a component that could fix an environmental condition that is outside of an acceptable operating range, such as a fan that may aid in reducing a temperature of the environment. A message from the server to an environmental sensor units may include commands to open the actuator, close the actuator, and to open or close an actuator based on a power status of the environmental sensor unit (e.g., open the relay, but only if the battery is not low).

As discussed above, through using a stateless protocol that communicates data according to a message formats like the message formats discussed above in connection with FIGS. 12 and 13, and energy consumption of the environmental monitoring system may be reduced.

Techniques operating according to the principles described herein may be implemented in any suitable manner. Included in the discussion above are a series of flow charts showing the steps and acts of various processes that operate an environmental monitoring system that monitors environmental conditions and exchange data regarding environmental conditions, in a manner that is inexpensive and easy. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as a portion of a computing device or as a stand-alone, separate storage medium. As used herein, "computer-readable media" (also called "computer-readable storage media" or a "storage") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system comprising:
an apparatus to process and transmit information produced by at least one environmental sensor, each of the at least one environmental sensor being configured to produce a value identifying a current environmental condition of an environment in which the apparatus is located, each environmental sensor being of a sensor type of a plurality of sensor types, the plurality of sensor types comprising a first sensor type and a second sensor type, each sensor type being associated with an environmental condition of a plurality of environmental conditions, the apparatus comprising:
a housing;
a plurality of wired communication ports;
at least one circuit, disposed within the housing, configured to perform a plurality of different processings on data values received from environmental sensors,
wherein each processing of the plurality of different processings is associated with at least one sensor type of the plurality of sensor types,
wherein the plurality of different processings comprise a first processing associated with the first sensor type and a second processing that is different from the first processing and is associated with the second sensor type, and
wherein the at least one circuit is further configured to:
in response to detecting that an environmental sensor has been connected to one of the plurality of wired communication ports, automatically determine a sensor type of the environmental sensor connected to the one wired communication port, wherein the at least one circuit is adapted to automatically determine the sensor type at least in part by automatically communicating with the environmental sensor connected to the one wired communication port;
in response to receiving a first communication comprising a first value that was produced by a first environmental sensor of the first sensor type and that indicates a state of a first current environmental condition monitored by the first environmental sensor,
select, from among the plurality of different processings, the first processing to perform on the first value, the first processing being selected based on, in a case that the first communication comprises a first identifier indicating the first sensor type of the first environmental sensor, the first identifier included in the first communication and/or based on, in a case that the first communication was received via a first wired communication port of the plurality of wired communication ports, identifying a sensor type associated with the first wired communication port, the sensor type associated with the first wired communication port having been automatically determined and stored in response to detecting connection of the first environmental sensor to the first wired communication port, and
perform the first processing on the first value to produce a first processed value,
wherein the at least one circuit is further configured to select a relay device to which to transmit the first processed value, wherein selecting the relay device to which to transmit the first processed value comprises:
broadcasting a first signal via a first wireless transceiver,
evaluating at least one first response communication received from at least one responding device using at least one criterion, wherein evaluating the at least one first response communication comprises evaluating a first response received from a first responding device configured to provide access to a server via a particular communication protocol and a second response received from a second responding device not configured to provide access to the server via the particular communication protocol, and
selecting, based on the evaluation, the relay device from among the at least one responding device, wherein selecting the relay device comprises selecting, from among the first and second responding devices, the first responding device as the relay device; and
the first wireless transceiver, disposed at least in part within the housing, to transmit the first processed value from the apparatus to the selected relay device according to a first wireless communication protocol, wherein transmitting the first processed value comprises formatting the first processed value in accordance with a data communication protocol; and
at least one relay device, each of the at least one relay device comprising at least one second wireless transceiver to communicate according to the first wireless communication protocol and a second wireless communication protocol, each relay device being configured to relay received communications to the server at least in part by receiving via the first wireless communication protocol one or more messages from the apparatus formatted according the data communication protocol and transmitting with the at least one second wireless transceiver and via the second wireless communication protocol the one or more messages formatted according to the data communication protocol,
wherein the first responding device is configured to provide access to the server via the second wireless communication protocol.

2. The apparatus of claim 1, wherein:
the first wireless communication protocol, according to which the first wireless transceiver is configured to transmit the first processed value, is a personal area network protocol, and
the data communication protocol, in accordance with which the apparatus is configured to format the first processed value for transmission, is a stateless protocol.

3. The apparatus of claim 1, further comprising:
at least one circuit board to which are connected the first environmental sensor, the at least one circuit, the first wireless transceiver, and the plurality of wired communication ports,
wherein a second environmental sensor is connected to one of the plurality of wired communication ports.

4. The apparatus of claim 1, wherein:
the housing is a first housing;
the first environmental sensor that produced the first value, the at least one circuit configured to perform the plurality of different processings to select in response to receipt of the first communication comprising the first value, the first wireless transceiver, and the plurality of wired communication ports are disposed in the first housing; and
the apparatus further comprises a second housing in which is disposed the second environmental sensor, the second housing being separate from the first housing.

5. The apparatus of claim 1, wherein the at least one circuit provides to the first wireless transceiver the first processed value for transmission together with an indication of the first sensor type, and wherein the indication of the first sensor type is the first identifier indicating the first sensor type.

6. The apparatus of claim 1, wherein the at least one circuit provides to the first wireless transceiver the first processed value for transmission together with an identifier for the apparatus.

7. The apparatus of claim 1, wherein:
the at least one circuit is configured to in response to a determination that another responding device from the at least one responding device is to be selected as the relay device to transmit the first processed value, select the another responding device from the at least one responding device and, following the selection, transmit the first processed value, via the first wireless transceiver, to the another responding device, and
the at least one circuit is configured to select the another responding device at least in part by broadcasting a second signal via the first wireless transceiver and evaluating at least one second response communication received from the at least one responding device using the at least one criterion.

8. The apparatus of claim 1, wherein the at least one circuit is configured to evaluate the at least one first response communication using at least one criterion at least in part by:
evaluating the at least one first response communication to determine which of the at least one first response communication has the highest signal strength; and
selecting, as the relay device, the one of the at least one responding device that is associated with the first response communication having the highest signal strength.

9. The apparatus of claim 1, wherein the at least one circuit is configured to, following the selection of the relay device:
transmit the first processed value, via the first wireless transceiver, to the relay device;
determine whether a response is received from the server, via the relay device;
when a response is received and one or more subsequent processed values from the at least one circuit is to be transmitted via the first wireless transceiver, transmit the one or more subsequent processed values to the relay device; and
when a response is not received, repeat the broadcasting and the evaluating to repeat the selection of another relay device to which to transmit the one or more subsequent processed values.

10. The apparatus of claim 1, wherein the first wireless transceiver is configured to transmit the first processed value together with an identifier for the relay device.

11. The apparatus of claim 1, wherein the first wireless transceiver is configured to transmit the first processed value together with data regarding a status of the apparatus.

12. The apparatus of claim 11, wherein the first wireless transceiver is configured to transmit the first processed value together with data regarding one or more of a version number of executable instructions stored on the apparatus, a version number of the first wireless communication protocol that the first wireless transmitter is configured to use, or a power status of the apparatus.

13. The apparatus of claim 1, wherein:
the at least one circuit is arranged to execute executable instructions to carry out one or more operations, and
the at least one circuit is configured to request an updated version of the executable instructions via the first wireless communication protocol when the first wireless transceiver receives a communication indicating that a new version of the executable instructions is available, the communication being received in response to transmission of the first processed value.

14. The apparatus of claim 13, wherein the at least one circuit is further configured to:
following request of the updated version of the executable instructions, enter a sleep mode;
following exit from the sleep mode, subsequently request the updated version of the executable instructions; and
when the updated version of the executable instructions is received in response to the subsequent request, update the executable instructions.

15. The apparatus of claim 1, wherein the first identifier indicating the first sensor type is an identifier indicating the first environmental sensor.

16. The apparatus of claim 1, wherein the at least one circuit is configured to select the first processing in response to receiving the first communication, comprising the first value and the first identifier, directly from the first environmental sensor.

17. The apparatus of claim 1, further comprising:
wherein the first environmental sensor is connected to one of the plurality of wired communication ports, and
wherein the at least one circuit is configured to select the first processing in response to receiving the first communication, comprising the first value and the first identifier, directly from the first environmental sensor.

18. The apparatus of claim 1, wherein:
evaluating the at least one first response communication received from the at least one responding device further comprises determining whether the first responding device is configured to provide access to the server via a wireless local area network (WLAN) protocol or a cellular protocol, and
selecting the relay device comprises selecting the first responding device in response to determining that the first responding device is configured to provide access to the server via the WLAN protocol.

19. A method for processing and transmitting information produced by at least one environmental sensor, each of the at least one environmental sensor being configured to produce a value identifying a current environmental condition of an environment in which an apparatus is located, each environmental sensor being of a sensor type of a plurality of sensor types, the plurality of sensor types comprising a first sensor type and a second sensor type, each sensor type being associated with an environmental condition of a plurality of environmental conditions, the method comprising:
in response to detecting that an environmental sensor has been connected to one of a plurality of wired communication ports, automatically determining a sensor type of the environmental sensor connected to the one wired communication port, wherein automatically determining the sensor type comprises automatically communicating with the environmental sensor connected to the one wired communication port;
in response to receiving a first message comprising a first value that indicates a state of a first current environmental condition:
selecting a first processing to perform on the first value, from among a plurality of different processings and based on, in a case that the first message comprises a first identifier indicating the first sensor type of a first environmental sensor, the first identifier of the first message and/or based on, in a case that the first message was received via a first wired communication port of the plurality of wired communication ports, identifying a sensor type associated with the first wired communication port, the sensor type associated with the first wired communication port having been automatically determined and stored in response to detecting connection of the first environmental sensor to the first wired communication port, wherein each processing of the plurality of different processings is associated with at least one sensor type of the plurality of sensor types and wherein the plurality of different processings comprise the first processing associated with the first sensor type and a second processing that is different from the first processing and is associated with the second sensor type;
performing the first processing on the first value to produce a first processed value;
select a relay device to which to transmit the first processed value, from among at least one responding device, wherein selecting the relay device to which to transmit the first processed value comprises:
broadcasting a signal and evaluating at least one response communication received from the at least one responding device using at least one criterion, wherein evaluating the at least one response communication comprises evaluating a first response received from a first responding device configured to provide access to a server via a particular communication protocol and a second response received from a second responding device not configured to provide access to the server via the particular communication protocol, and
selecting, based on the evaluation, the relay device from among the at least one responding device, wherein selecting the relay device comprises selecting, from among the first and second responding devices, the first responding device as the relay device;
wirelessly transmitting the first processed value according to a first wireless communication protocol to the selected relay device, wherein transmitting the first processed value comprises formatting the first processed value in accordance with a data communication protocol;
relaying, with the selected relay device, received communications to the server at least in part by receiving via the first wireless communication protocol one or more messages formatted according the data communication protocol and transmitting via a second wireless communication protocol the one or more messages formatted according to the data communication protocol,
wherein the first responding device is configured to provide access to the server via the second wireless communication protocol.

20. At least one non-transitory computer-readable storage medium having encoded thereon:
   first executable instructions that, when executed by at least one processor, cause the at least one processor to carry out a first processing on a first value, produced by an environmental sensor of a first sensor type, to produce a first processed value;
   second executable instructions that, when executed by the at least one processor, cause the at least one processor to carry out a second processing on a second value, produced by an environmental sensor of a second sensor type, to produce a second processed value;
   third executable instructions that, when executed by the at least one processor, cause the at least one processor to, in response to detecting that an environmental sensor has been connected to one of a plurality of wired communication ports, automatically determining a sensor type of the environmental sensor connected to the one wired communication port, wherein automatically determining the sensor type comprises automatically communicating with the environmental sensor connected to the one wired communication port;
   fourth executable instructions that, when executed by the at least one processor, cause the at least one processor to carry out a method for processing and transmitting information produced by at least one environmental sensor, each of the at least one environmental sensor being configured to produce a value identifying a current environmental condition of an environment in which an apparatus is located, each environmental sensor being of a sensor type of a plurality of sensor types, the plurality of sensor types comprising the first sensor type and the second sensor type, each sensor type being associated with an environmental condition of a plurality of environmental conditions, the method comprising:
      in response to receiving from a first environmental sensor a first value that indicates a state of a first current environmental condition monitored by the first environmental sensor,
         selecting a processing to perform on the first value from among the first processing and the second processing based on, in a case that the first value was received with a first identifier indicating the first sensor type of the first environmental sensor, the first identifier that indicates the sensor type of the first environmental sensor and/or based on, in a case that the first value was received via a first wired communication port of the plurality of wired communication ports, identifying a sensor type associated with the first wired communication port, the sensor type associated with the first wired communication port having been automatically determined and stored in response to detecting connection of the first environmental sensor to the first wired communication port, wherein the selecting comprises selecting the first processing when the first identifier indicates the first sensor type and selecting the second processing when the first identifier indicates the second sensor type;
         performing the selected processing on the first value to produce a first processed value;
         select a relay device to which to transmit the first processed value, from among at least one responding device, wherein selecting the relay device to which to transmit the first processed value comprises:
            broadcasting a signal and evaluating at least one response communication received from the at least one responding device using at least one criterion, wherein evaluating the at least one response communication comprises evaluating a first response received from a first responding device configured to provide access to a server via a particular communication protocol and a second response received from a second responding device not configured to provide access to the server via the particular communication protocol, and
            selecting, based on the evaluation, the relay device from among the at least one responding device, wherein selecting the relay device comprises selecting, from among the first and second responding devices, the first responding device as the relay device; and
         wirelessly transmitting the first processed value according to a first wireless communication protocol, wherein transmitting the first processed value comprises formatting the first processed value in accordance with a data communication protocol; and
   fifth executable instructions that, when executed by at least one second processor of a relay device, cause the at least one second processor to relay received communications to the server at least in part by receiving via the first wireless communication protocol one or more messages formatted according the data communication protocol and transmitting via a second wireless communication protocol the one or more messages formatted according to the data communication protocol,
   wherein the first responding device is configured to provide access to the server via the second wireless communication protocol.

21. The at least one non-transitory computer-readable storage medium of claim 20, wherein:
   the first executable instructions comprise instructions to perform a first transformation on a first analog value, produced by an environmental sensor of the first sensor type, to produce a first digital value;
   the second executable instructions comprise instructions to perform a second transformation on a second analog value, produced by an environmental sensor of the second sensor type, to produce a second digital value; and
   the first transformation is different from the second transformation.

22. The at least one non-transitory computer-readable storage medium of claim 21, wherein:
   the first transformation comprises performing a first analog-to-digital conversion to convert a first analog value, produced an environmental sensor of the first sensor type, into a first digital value in a first manner; and
   the second transformation comprises performing a second analog-to-digital conversion to convert a second analog value, produced an environmental sensor of the second sensor type, into a second digital value in a second manner different from the first manner.

23. The at least one non-transitory computer-readable storage medium of claim 22, wherein the first analog-to-digital conversion converts the first analog value into an integer on a first scale and the second analog-to-digital conversion converts the second analog value into an integer on a second scale different from the first scale.

24. The at least one non-transitory computer-readable storage medium of claim 22, wherein performing the selected processing on the first value to produce a first processed value comprises performing one of the first analog-to-digital conversion or the second analog-to-digital conversion to produce a digital value based on the first value, the digital value indicating, in a digital representation, the state of the first current environmental condition that is indicated by the first value in an analog representation.

* * * * *